US012746710B2

(12) United States Patent
Chevrette et al.

(10) Patent No.: US 12,746,710 B2
(45) Date of Patent: Sep. 29, 2026

(54) PLASTICS PROCESSING AND PLASTICS RECOVERY FACILITY

(71) Applicant: WM Intellectual Property Holdings, L.L.C., Houston, TX (US)

(72) Inventors: Guillaume Chevrette, Anjou (CA); Ganesh Nagarajan, Katy, TX (US)

(73) Assignee: WM Intellectual Property Holdings, L.L.C., Houston, TX (US)

( * ) Notice: Subject to any disclaimer, the term of this patent is extended or adjusted under 35 U.S.C. 154(b) by 0 days.

(21) Appl. No.: 19/301,498

(22) Filed: Aug. 15, 2025

(65) Prior Publication Data

US 2026/0048529 A1 Feb. 19, 2026

Related U.S. Application Data

(60) Provisional application No. 63/683,603, filed on Aug. 15, 2024.

(51) Int. Cl.
*B29B 17/02* (2006.01)
*B29B 17/00* (2006.01)

(52) U.S. Cl.
CPC ...... *B29B 17/02* (2013.01); *B29B 2017/0089* (2013.01)

(58) Field of Classification Search
USPC ........................................................... 521/40
See application file for complete search history.

(56) References Cited

U.S. PATENT DOCUMENTS

| | | | |
|---|---|---|---|
| 3,732,034 | A | 5/1973 | Reid et al. |
| 3,848,813 | A | 11/1974 | Stanczyk et al. |
| 3,934,394 | A | 1/1976 | Garrison |
| 4,065,282 | A | 12/1977 | Morey |
| 4,191,511 | A | 3/1980 | Stewart et al. |
| 4,227,849 | A | 10/1980 | Worthington |
| 4,236,222 | A | 11/1980 | Loshbough et al. |
| 4,362,097 | A | 12/1982 | Rogers |
| 4,454,028 | A | 6/1984 | Vetter et al. |
| 4,460,131 | A | 7/1984 | Cerroni |
| 4,612,078 | A | 9/1986 | Karp |
| 4,730,790 | A | 3/1988 | Williams |
| 4,742,880 | A | 5/1988 | Schrag et al. |
| 4,874,134 | A | 10/1989 | Wiens |
| 5,071,075 | A | 12/1991 | Wiens |
| 5,101,977 | A | 4/1992 | Roman |
| 5,148,758 | A | 9/1992 | Saly et al. |
| 5,150,307 | A | 9/1992 | Mccourt et al. |
| 5,184,780 | A | 2/1993 | Wiens |
| 5,213,593 | A | 5/1993 | White, Jr. |
| 5,250,100 | A | 10/1993 | Armbristor |
| 5,333,738 | A | 8/1994 | Fuchs et al. |
| 5,411,147 | A | 5/1995 | Bond |
| 5,551,218 | A | 9/1996 | Henderson et al. |
| 5,565,846 | A | 10/1996 | Geiszler et al. |
| 5,610,516 | A | 3/1997 | Maier |
| 5,649,785 | A | 7/1997 | Djerf et al. |
| 6,021,712 | A | 2/2000 | Harrop |
| 6,123,017 | A | 9/2000 | Litle et al. |
| 6,136,590 | A | 10/2000 | Kruse |
| 6,138,557 | A | 10/2000 | Brown et al. |
| 6,139,280 | A | 10/2000 | Holt et al. |
| 6,199,702 | B1 | 3/2001 | Buer |
| 6,217,288 | B1 | 4/2001 | Mirsky et al. |
| 6,230,780 | B1 | 5/2001 | Rietheimer |
| 6,250,472 | B1 | 6/2001 | Grubbs et al. |
| 6,264,038 | B1 | 7/2001 | Schmidt |
| 6,378,276 | B1 | 4/2002 | Dorge et al. |
| 6,474,228 | B1 | 11/2002 | Leupe et al. |
| 6,527,206 | B1 | 3/2003 | Wuebbels et al. |
| 6,578,783 | B2 | 6/2003 | Simon et al. |

(Continued)

FOREIGN PATENT DOCUMENTS

| | | |
|---|---|---|
| BE | 1028913 A1 | 7/2022 |
| CA | 3035602 | 3/2018 |

(Continued)

OTHER PUBLICATIONS

Access Protocols for All State Offices and Facilities; Nov. 18, 2020; https://dbm.maryland. gov/employees/documents/covid-19%20building%20entry%20protocol.pdf; 2 pages.
Canadian Intellectual Property Office; Examiner Report, issued in connection to application No. 3,035,602; Sep. 29, 2023; 4 pages; Canada.
Canadian Intellectual Property Office; Office Action, issued in connection to application No. 3,063,184; Mar. 28, 2025; 4 pages; Canada.
Canadian Intellectual Property Office; Office Action, issued in connection to application No. 3035600, Mar. 13, 2024; 3 pages; Canada.
Canadian Intellectual Property Office; Office Action, issued in connection to application No. 3035601; Feb. 29, 2024; 3 pages; Canada.

(Continued)

*Primary Examiner* — Terressa Boykin
(74) *Attorney, Agent, or Firm* — Greenberg Traurig LLP

(57) ABSTRACT

A system and method for sorting and recovery of materials in a combination of a plastics processing facility (PPF) and a plastics recovery or recycling facility (PRF) is provided. The system can include a first line comprising a polyethylene terephthalate (PET) processing line, a second line comprising a polyethylene (PE), polypropylene (PP) and polystyrene (PS) processing line, a third line comprising a plastics residuals recovery line, a fourth line comprising a fines and glass residue processing line, and a fifth line comprising a flexible plastic packaging processing line. The first line, the second line, the third line, the fourth line and the fifth line can all be located in close co-operational proximity on the same physical footprint and at the same site to process recovered plastics thus creating economies of scale and efficiency while meeting or exceeding minimum material quality specifications.

11 Claims, 18 Drawing Sheets

(56) References Cited

U.S. PATENT DOCUMENTS

| | | | |
|---|---|---|---|
| 6,593,853 B1 | 7/2003 | Barrett et al. | |
| 6,633,798 B2 | 10/2003 | Daniel et al. | |
| 6,787,713 B2 | 9/2004 | Kuechenmeister et al. | |
| 6,974,097 B2 | 12/2005 | Simon et al. | |
| 7,146,294 B1 | 12/2006 | Waitkus, Jr. | |
| 7,293,415 B2 | 11/2007 | Hoffmann et al. | |
| 7,389,880 B2 | 6/2008 | Goldmann et al. | |
| 7,406,402 B1 | 7/2008 | Waitkus, Jr. | |
| 7,503,513 B2 | 3/2009 | Simon et al. | |
| 7,584,856 B2 | 9/2009 | Miller et al. | |
| 7,674,055 B2 | 3/2010 | Hiroike et al. | |
| 7,685,192 B1 | 3/2010 | Scofield et al. | |
| 7,728,730 B2 | 6/2010 | Langlois et al. | |
| 7,743,699 B1 | 6/2010 | Freeman et al. | |
| 7,810,646 B2 | 10/2010 | Miller et al. | |
| 7,892,500 B2 * | 2/2011 | Carner ..................... | C10G 1/10 208/143 |
| 7,897,884 B2 | 3/2011 | Harish | |
| 7,957,937 B2 | 6/2011 | Waitkus, Jr. | |
| 7,983,929 B2 | 7/2011 | Zimmerman | |
| 8,006,734 B2 | 8/2011 | Hajny et al. | |
| 8,046,192 B2 | 10/2011 | Mcclain | |
| 8,146,841 B2 | 4/2012 | Andela | |
| 8,162,213 B2 | 4/2012 | Larson et al. | |
| 8,165,890 B2 | 4/2012 | Roberts | |
| 8,165,891 B2 | 4/2012 | Roberts | |
| 8,211,211 B1 | 7/2012 | Knaebel | |
| 8,275,630 B2 | 9/2012 | Dunning | |
| 8,285,681 B2 | 10/2012 | Prahlad et al. | |
| 8,311,975 B1 | 11/2012 | Gonsalves | |
| 8,322,639 B2 | 12/2012 | Gitschel | |
| 8,362,903 B2 | 1/2013 | Lindh et al. | |
| 8,371,214 B1 | 2/2013 | Correale et al. | |
| 8,392,135 B2 | 3/2013 | Mcclain et al. | |
| 8,393,558 B2 | 3/2013 | Gitschel | |
| 8,398,006 B2 | 3/2013 | Gitschel | |
| 8,459,466 B2 | 6/2013 | Duffy et al. | |
| 8,579,997 B2 | 11/2013 | Bai | |
| 8,684,288 B2 | 4/2014 | Gitschel | |
| 8,812,971 B2 | 8/2014 | Benedek et al. | |
| 8,813,972 B1 | 8/2014 | Centers | |
| 8,882,955 B2 | 11/2014 | Brandon et al. | |
| 9,061,289 B2 | 6/2015 | Gitschel | |
| 9,545,650 B2 | 1/2017 | Wang et al. | |
| 9,649,666 B2 | 5/2017 | Gitschel | |
| 9,713,812 B1 | 7/2017 | Gitschel | |
| 9,884,324 B2 | 2/2018 | Gitschel | |
| 9,913,429 B1 | 3/2018 | Stubbs et al. | |
| 9,945,608 B2 | 4/2018 | Ploeger et al. | |
| 10,021,859 B1 | 7/2018 | Miller | |
| 10,311,394 B2 | 6/2019 | Miller et al. | |
| 10,377,518 B2 | 8/2019 | Waite et al. | |
| 10,438,281 B2 | 10/2019 | Walsh et al. | |
| 10,464,105 B2 | 11/2019 | Koistinen et al. | |
| 10,535,022 B1 | 1/2020 | Hood et al. | |
| 10,564,029 B2 | 2/2020 | Waite et al. | |
| 10,661,984 B2 | 5/2020 | Chan et al. | |
| 10,678,272 B2 | 6/2020 | Lattanzio et al. | |
| 10,793,377 B2 | 10/2020 | Martin et al. | |
| 10,799,915 B2 | 10/2020 | Horowitz et al. | |
| 10,835,927 B2 | 11/2020 | Torriere | |
| 10,853,353 B2 | 12/2020 | Balaraman et al. | |
| 10,864,555 B2 | 12/2020 | Mccoy, Jr. et al. | |
| 10,984,394 B2 | 4/2021 | Collins et al. | |
| 11,059,075 B2 | 7/2021 | Mccoy, Jr. et al. | |
| 11,069,053 B2 | 7/2021 | Horowitz et al. | |
| 11,117,169 B2 | 9/2021 | Torriere | |
| 11,123,939 B2 | 9/2021 | Chan et al. | |
| 11,148,383 B2 | 10/2021 | Waite et al. | |
| 11,162,834 B2 | 11/2021 | Waite et al. | |
| 11,241,854 B2 | 2/2022 | Waite et al. | |
| 11,327,957 B2 | 5/2022 | Su et al. | |
| 11,481,257 B2 | 10/2022 | Sharma et al. | |
| 11,508,021 B2 | 11/2022 | Hovhannisyan et al. | |
| 11,571,869 B2 | 2/2023 | Chan et al. | |
| 11,651,334 B1 | 5/2023 | Megyese et al. | |
| 11,673,703 B1 | 6/2023 | Gaydos et al. | |
| 11,693,705 B2 | 7/2023 | Sharma et al. | |
| 11,707,747 B1 | 7/2023 | Torriere | |
| 11,717,857 B2 | 8/2023 | Torriere | |
| 11,734,074 B2 | 8/2023 | Sharma et al. | |
| 11,776,670 B1 | 10/2023 | Walk et al. | |
| 11,780,190 B2 | 10/2023 | Chan et al. | |
| 11,850,761 B2 | 12/2023 | Peterson et al. | |
| 11,850,818 B2 | 12/2023 | Chan et al. | |
| 11,875,296 B2 | 1/2024 | Benjamin et al. | |
| 12,044,470 B2 | 7/2024 | Christensen et al. | |
| 12,070,921 B1 | 8/2024 | Drier et al. | |
| 12,077,257 B2 | 9/2024 | Maydanik | |
| 12,103,045 B2 | 10/2024 | Kumar et al. | |
| 12,138,883 B2 | 11/2024 | Chan et al. | |
| 12,139,293 B1 | 11/2024 | Gaydos et al. | |
| 12,269,233 B2 | 4/2025 | Chan et al. | |
| 12,440,852 B1 | 10/2025 | Torriere | |
| 12,485,536 B2 | 12/2025 | Byars et al. | |
| 12,496,618 B2 | 12/2025 | Filler et al. | |
| 12,505,530 B2 | 12/2025 | Lamb et al. | |
| 2002/0020175 A1 | 2/2002 | Street et al. | |
| 2002/0108507 A1 | 8/2002 | May et al. | |
| 2003/0028289 A1 | 2/2003 | Daniel et al. | |
| 2003/0053906 A1 | 3/2003 | Itou et al. | |
| 2003/0183705 A1 | 10/2003 | Christiani et al. | |
| 2005/0015287 A1 | 1/2005 | Beaver | |
| 2005/0065640 A1 | 3/2005 | Mallett et al. | |
| 2005/0126958 A1 | 6/2005 | Bohlig et al. | |
| 2005/0183990 A1 | 8/2005 | Corbett | |
| 2005/0197175 A1 | 9/2005 | Anderson | |
| 2005/0209905 A2 | 9/2005 | Ness et al. | |
| 2005/0242006 A1 | 11/2005 | Bohlig et al. | |
| 2005/0280537 A1 | 12/2005 | Feltz et al. | |
| 2006/0080819 A1 | 4/2006 | Mcallister | |
| 2006/0254957 A1 | 11/2006 | Bohlig et al. | |
| 2007/0102109 A1 | 5/2007 | Katritzky et al. | |
| 2007/0209530 A1 | 9/2007 | Viaud | |
| 2008/0041982 A1 | 2/2008 | Paulson et al. | |
| 2008/0141714 A1 | 6/2008 | Cartwright et al. | |
| 2008/0197058 A1 | 8/2008 | Kenny | |
| 2008/0197194 A1 | 8/2008 | Flood | |
| 2009/0008298 A1 | 1/2009 | Studley | |
| 2009/0281677 A1 | 11/2009 | Botich et al. | |
| 2010/0011717 A1 | 1/2010 | Rivard | |
| 2010/0116881 A1 | 5/2010 | Flood et al. | |
| 2010/0145629 A1 | 6/2010 | Botich et al. | |
| 2010/0228601 A1 | 9/2010 | Vaswani et al. | |
| 2010/0235209 A1 | 9/2010 | Vaswani et al. | |
| 2010/0299097 A1 | 11/2010 | Threlkeld et al. | |
| 2011/0071867 A1 | 3/2011 | Chen et al. | |
| 2012/0004938 A1 | 1/2012 | Beaver | |
| 2012/0029980 A1 | 2/2012 | Paz | |
| 2012/0048129 A1 | 3/2012 | Smith et al. | |
| 2012/0168354 A1 | 7/2012 | Sundholm | |
| 2012/0199519 A1 | 8/2012 | Ward | |
| 2012/0204740 A1 | 8/2012 | Bergmann | |
| 2012/0217328 A1 | 8/2012 | Bohlig et al. | |
| 2012/0266763 A1 | 10/2012 | Foster et al. | |
| 2013/0008324 A1 | 1/2013 | Verhaeghe et al. | |
| 2013/0132233 A1 | 5/2013 | Rothley et al. | |
| 2013/0290511 A1 | 10/2013 | Tu et al. | |
| 2014/0012553 A1 | 1/2014 | Kelly et al. | |
| 2014/0156541 A1 | 6/2014 | Waite et al. | |
| 2014/0157999 A1 | 6/2014 | Verhaeghe et al. | |
| 2014/0214220 A1 | 7/2014 | Kamel et al. | |
| 2014/0222665 A1 | 8/2014 | Kamel et al. | |
| 2014/0236680 A1 | 8/2014 | Chen et al. | |
| 2014/0303935 A1 | 10/2014 | Kamel et al. | |
| 2014/0337107 A1 | 11/2014 | Foster | |
| 2015/0199846 A1 | 7/2015 | Sanderson et al. | |
| 2015/0204591 A1 | 7/2015 | Burg et al. | |
| 2015/0283551 A1 | 10/2015 | Gitschel | |
| 2015/0379785 A1 | 12/2015 | Brown, Jr. et al. | |
| 2016/0014965 A1 | 1/2016 | Naeyaert et al. | |
| 2016/0023417 A1 | 1/2016 | Hanson et al. | |
| 2016/0081276 A1 | 3/2016 | Riesterer et al. | |
| 2016/0088798 A1 | 3/2016 | Lang et al. | |

(56) References Cited

U.S. PATENT DOCUMENTS

| | | | |
|---|---|---|---|
| 2016/0166980 | A1 | 6/2016 | Pan et al. |
| 2016/0187185 | A1 | 6/2016 | Smith |
| 2016/0203146 | A1 | 7/2016 | Moll et al. |
| 2016/0339445 | A1 | 11/2016 | Robinson |
| 2017/0008671 | A1 | 1/2017 | Whitman et al. |
| 2017/0011362 | A1 | 1/2017 | Whitman et al. |
| 2017/0014868 | A1 | 1/2017 | Garcia, Jr. et al. |
| 2017/0178066 | A1 | 6/2017 | High et al. |
| 2017/0200135 | A1 | 7/2017 | Whitman et al. |
| 2017/0202150 | A1 | 7/2017 | Smith |
| 2017/0211969 | A1 | 7/2017 | Waite et al. |
| 2017/0225199 | A1 | 8/2017 | Koistinen et al. |
| 2017/0226439 | A1 | 8/2017 | Nguyen et al. |
| 2017/0283292 | A1 | 10/2017 | Kim |
| 2018/0037830 | A1 | 2/2018 | Bohlig et al. |
| 2018/0056617 | A1 | 3/2018 | Chan et al. |
| 2018/0056618 | A1 | 3/2018 | Chan et al. |
| 2018/0057259 | A1 | 3/2018 | Chan et al. |
| 2018/0112142 | A1 | 4/2018 | Foody et al. |
| 2018/0229273 | A1 | 8/2018 | Carvajo Lucena et al. |
| 2018/0268379 | A1 | 9/2018 | Collins et al. |
| 2018/0364093 | A1 | 12/2018 | Vasconcelos et al. |
| 2019/0030571 | A1 | 1/2019 | Horowitz et al. |
| 2019/0039772 | A1 | 2/2019 | Le |
| 2019/0039837 | A1 | 2/2019 | Zhou et al. |
| 2019/0084012 | A1 | 3/2019 | Mccoy, Jr. et al. |
| 2019/0130560 | A1 | 5/2019 | Horowitz et al. |
| 2019/0148797 | A1 | 5/2019 | Paszti |
| 2019/0217342 | A1 | 7/2019 | Parr et al. |
| 2019/0224617 | A1 | 7/2019 | Mitariten |
| 2019/0224935 | A1 | 7/2019 | Waite et al. |
| 2019/0249666 | A1 | 8/2019 | Lindberg et al. |
| 2019/0293478 | A1 | 9/2019 | Waite et al. |
| 2019/0304236 | A1 | 10/2019 | Chan et al. |
| 2020/0010271 | A1 | 1/2020 | Bourn et al. |
| 2020/0031513 | A1 | 1/2020 | Beach |
| 2020/0048015 | A1 | 2/2020 | Martin et al. |
| 2020/0087118 | A1 | 3/2020 | Sato et al. |
| 2020/0129989 | A1 | 4/2020 | Schultz |
| 2020/0164608 | A1 | 5/2020 | Waite et al. |
| 2020/0171547 | A1 | 6/2020 | Torriere |
| 2020/0197981 | A1 | 6/2020 | Neige et al. |
| 2020/0222949 | A1 | 7/2020 | Murad et al. |
| 2020/0338753 | A1 | 10/2020 | Schultz et al. |
| 2020/0338758 | A1 | 10/2020 | Schultz et al. |
| 2021/0012254 | A1 | 1/2021 | Campbell et al. |
| 2021/0046513 | A1 | 2/2021 | Mccoy, Jr. et al. |
| 2021/0060618 | A1 | 3/2021 | Torriere |
| 2021/0086999 | A1 | 3/2021 | Martin et al. |
| 2021/0094075 | A1 | 4/2021 | Horowitz et al. |
| 2021/0094894 | A1 | 4/2021 | Whitmore |
| 2021/0170707 | A1 | 6/2021 | Chan et al. |
| 2021/0179366 | A1 | 6/2021 | Mccoy, Jr. et al. |
| 2021/0206586 | A1 | 7/2021 | Douglas et al. |
| 2021/0206588 | A1 | 7/2021 | Douglas et al. |
| 2021/0217156 | A1 | 7/2021 | Balachandran et al. |
| 2021/0290177 | A1 | 9/2021 | Novak, Jr. et al. |
| 2021/0296008 | A1 | 9/2021 | Novak, Jr. et al. |
| 2021/0327187 | A1 | 10/2021 | Wisniewski |
| 2021/0328801 | A1 | 10/2021 | Sly et al. |
| 2021/0335074 | A1 | 10/2021 | Cowles et al. |
| 2021/0335458 | A1 | 10/2021 | Mcmullen |
| 2021/0338102 | A1 | 11/2021 | Palacios et al. |
| 2021/0375084 | A1 | 12/2021 | Aubrey et al. |
| 2021/0402439 | A1 | 12/2021 | Torriere |
| 2022/0027810 | A1 | 1/2022 | Murthy et al. |
| 2022/0055071 | A1 | 2/2022 | Sharma et al. |
| 2022/0108252 | A1 | 4/2022 | Narasimhan et al. |
| 2022/0168898 | A1 | 6/2022 | Satat |
| 2022/0180501 | A1 | 6/2022 | Perez |
| 2022/0184855 | A1 | 6/2022 | Mleczko et al. |
| 2022/0214273 | A1 | 7/2022 | Vandeputte et al. |
| 2022/0230251 | A1 | 7/2022 | Kawamori et al. |
| 2022/0274895 | A1 | 9/2022 | Mcconell |
| 2022/0327538 | A1 | 10/2022 | Kumar et al. |
| 2022/0343433 | A1 | 10/2022 | Yan et al. |
| 2023/0061787 | A1 | 3/2023 | Feickert et al. |
| 2023/0061958 | A1 | 3/2023 | Al Hosani et al. |
| 2023/0120932 | A1 | 4/2023 | Parr et al. |
| 2023/0144877 | A1 | 5/2023 | Soundarrajan et al. |
| 2023/0173543 | A1 | 6/2023 | Kumar et al. |
| 2023/0286239 | A1 | 9/2023 | Chan et al. |
| 2023/0305565 | A1 | 9/2023 | Morris |
| 2023/0312273 | A1 | 10/2023 | Teichrob et al. |
| 2023/0381824 | A1 | 11/2023 | Dadlani |
| 2023/0394495 | A1 | 12/2023 | Abdelsamic |
| 2024/0034019 | A1 | 2/2024 | Chan et al. |
| 2024/0037471 | A1 | 2/2024 | Jones et al. |
| 2024/0059858 | A1* | 2/2024 | Huber .................... B29B 17/02 |
| 2024/0075702 | A1 | 3/2024 | Chan et al. |
| 2024/0085102 | A1 | 3/2024 | Christensen et al. |
| 2024/0100567 | A1 | 3/2024 | Mckiver |
| 2024/0183609 | A1 | 6/2024 | Christensen et al. |
| 2024/0198390 | A1 | 6/2024 | Parr et al. |
| 2024/0281713 | A1 | 8/2024 | Gupta et al. |
| 2024/0338655 | A1 | 10/2024 | Vandeputte |
| 2024/0417891 | A1 | 12/2024 | Yip et al. |
| 2025/0018401 | A1 | 1/2025 | Torriere et al. |
| 2025/0108408 | A1 | 4/2025 | Potter et al. |
| 2025/0135497 | A1 | 5/2025 | Chevrette et al. |
| 2025/0166353 | A1 | 5/2025 | Luce et al. |

FOREIGN PATENT DOCUMENTS

| | | | |
|---|---|---|---|
| CN | 204494897 | U | 7/2015 |
| CN | 206796893 | | 12/2017 |
| CN | 107697380 | | 2/2018 |
| CN | 108643104 | | 10/2018 |
| CN | 109178728 | | 1/2019 |
| CN | 110717368 | A | 1/2020 |
| CN | 112502953 | | 3/2021 |
| CN | 113998335 | A | 2/2022 |
| CN | 115111673 | A | 9/2022 |
| CN | 116967155 | A | 10/2023 |
| DE | 10006740 | A1 | 8/2001 |
| EP | 0557816 | A2 | 9/1993 |
| EP | 4272136 | | 11/2023 |
| GB | 2488996 | | 9/2012 |
| JP | 3145885 | U | 10/2008 |
| KR | 102865415 | B1 | 9/2025 |
| WO | 1999/037474 | | 7/1999 |
| WO | 03/031167 | | 4/2003 |
| WO | 2004/012866 | | 2/2004 |
| WO | 2018/044496 | A1 | 3/2018 |
| WO | 2018/057126 | | 3/2018 |
| WO | 2018/044498 | | 8/2018 |
| WO | 2019/195257 | | 10/2019 |
| WO | 2021/207240 | | 10/2021 |
| WO | 2022/146427 | | 7/2022 |
| WO | 2022/190230 | A1 | 9/2022 |
| WO | 2023/001935 | A1 | 1/2023 |
| WO | 2024/009118 | A1 | 1/2024 |
| WO | 2024/054552 | | 3/2024 |
| WO | 2026/039767 | A1 | 2/2026 |

OTHER PUBLICATIONS

Canadian Intellectual Property Office; Office Action, issued in connection to application No. 3095894; Jul. 31, 2025; 8 pages; Canada.

Canadian Intellectual Property Office; Office Action, issued in connection to patent application No. 3035600; Mar. 13, 2024; 3 pages; Canada.

Couling, Tom; Recovering Recyclables Through Mixed Waste Processing; Public Works 124.n2:p53; Hanley-Wood, Inc.; Feb. 1993; 3 pages.

Crowdblink, Employee Health Screening App: Daily Covid-19 Assessments, Nov. 19, 2021.

EchoHedge; Carbon Accounting Software: Streamline Your Sustainability Efforts; EcoHedge Ltd.; Jan. 8, 2024; 20 pages.

(56) References Cited

OTHER PUBLICATIONS

European Patent Office; PCT International Search Report, issued in connection to application No. PCT/US2023/032164; 7 pages; Apr. 9, 2024; EUROPE.
European Patent Office; PCT International Search Report, Issued in connection to PCT/US2025/042232; Dec. 16, 2025; 5 pages; Europe.
European Patent Office; PCT Written Opinion of the International Searching Authority, issued in connection to application No. PCT/US2023/032164; 13 pages; Apr. 9, 2024; Europe.
European Patent Office; PCT Written Opinion of the International Searching Authority, Issued in connection to PCT/US2025/042232; Dec. 16, 2025; 9 pages; Europe.
Goevo, Return to work safely and quickly with the Personal Protective App (PPA), Dec. 31, 2021.
Graniefuel Engineering; Alliance Dairies' RNG Plant; 2023; 4 pages.
Higley, Card Access Data Integration and Reporting During COVID-19, Aug. 31, 2020.
Humpston, Giles et al.; Identification of Fibre Composition of Apparel for Recycling; Dec. 31, 2015; 15 pages.
International Search Report and Written Opinion, issued in connection to application No. PCT/US2017/045315, Oct. 30, 2017.
Kareem, Shefy Manayil; Introducing new ESG data and reporting capabilities in Microsoft Cloud for Sustainability; Jun. 15, 2023; 11 pages.
Kat, Jeff; Research Targets Sorting Robots and Separating Chemicals to Improve Plastic Recycling; https://www.forbes.com/sites/jeffkart/2021/01/15/research-targets-sorting-robots-and-separating-chemicals-to-improve-plastic-recycling/?sh=46705ab53fd1; Jan. 15, 2021; 4 pages.
Konstantinidis, Fotiios K et al.; Multi-sensor cyber-physical sorting system (CPSS) based on Industry 4.0 principles: A multi-functional approach; Elsevier B.V.; 2022.
Lawton, George; 18 Sustainability Management Software Providers to Consider; Apr. 11, 2023; 10 pages.
Mathai, George et al.; HartEnergy: Controlling Reciprocating Compressors; Jul. 1, 2008; 10 pages.
Mexican Institute of Industrial Property; Office Action, issued in connection to application No. MX/a/2019/002485; 4 pages; Aug. 25, 2023; Mexico.
Mexican Institute of Industrial Property; Office Action, issued in connection to application No. MX/a/2019/002485; 4 pages; Nov. 27, 2019; Mexico.
Mexican Institute of Industrial Property; Office Action, issued in connection to application No. MX/a/2019/002485; 5 pages; Apr. 30, 2019; Mexico.
Mexican Institute of Industrial Property; Office Action, issued in connection to application No. MX/a/2019/002485; 5 pages; Feb. 16, 2024; Mexico.
Microsoft, Use the Employee Return to the Workplace app, Aug. 3, 2021.
Perennial Energy; Biogas Processing Systems; 2015; 2 pages.
Perez, Maria Marin; Analysis of European post-consumer textile waste for automated sorting; Dec. 31, 2021; 40 pages.
Public Works; Refuse Processing and Resource Recovery; Public Works 125 n5: pE22; Hanley-Wood, Inc.; Apr. 15, 1994; 18 pages.
Returnsafe, Health Screening Prior to Entering the Workplace, Nov. 19, 2021.
Riba, Jordi-Roger et al.; Post-Consumer Textile Waste Classification through Near-Infrared Spectroscopy, Using an Advanced Deep Learning Approach; Polymers; Jun. 17, 2022; 14 pages.
Ryerson, Introducing RyersonSafe for health screening process for all students, faculty, staff, visitor, Jul. 12, 2021.
Schneider, Robert J. et al.; Multilevel MRF Solves Solid Waste Challenges; BioCycle 34.5: 62.J.G.; Press Inc.; May 1993; 4 pages.
Servicenow, Configure Employee Health Screening, Dec. 31, 2021.
Spyridis, Yannis et al., Autonomous AI-enabled Industrial Sorting Pipeline for Advanced Textile Recycling; Apr. 29, 2024; 7 pages.
Spyridis, Yannis et al.; Textile Analysis for Recycling Automation using Transfer Learning and Zero-Shot Foundation Models; Jun. 6, 2025; 7 pages.
The International Bureau of WIPO; PCT International Preliminary Report on Patentability, issued in connection to application No. PCT/US2017/045294; Mar. 5, 2019; 7 pages; Switzerland.
The International Bureau of WIPO; PCT International Preliminary Report on Patentability, issued in connection to application No. PCT/US2023/032164; Mar. 20, 2025; 13 pages; Switzerland.
The International Bureau of WIPO; PCT International Preliminary Report on Patentability, issued in connection to application PCT/US2017/045278; Mar. 5, 2019; 9 pages; Switzerland.
The International Bureau of WIPO; PCT International Preliminary Report on Patentability, issued in connection with application No. PCT/US2019/025345; 8 pages; Switzerland.
Toto, Deanne; AMP Robotics Introduces Material Characterization Software; https://www.wastetodaymagazine.com/article/amp-material-characterization-software-mf-operations/; Apr. 27, 2021; 11 pages.
U.S. Patent and Trademark Office; PCT International Search Report, issued in connection to application No. PCT/US2017/045294; Oct. 10, 2017; 2 pages; US.
U.S. Patent and Trademark Office; PCT Written Opinion of the International Searching Authority, issued in connection to application No. PCT/US2017/045294; Oct. 10, 2017; 6 pages; US.
Ullal, Mithun S., et al.; AI-enabled robotic sorting for circular textile waste management: A scalable solution for India's recycling sector; Nov. 1, 2025; pp. 876-882.
United States Patent and Trademark Office; PCT International Search Report, issued in connection to application PCT/US2017/045278; Nov. 2, 2017; 3 pages; US.
United States Patent and Trademark Office; PCT International Search Report, issued in connection with application No. PCT/US2019/025345; Jul. 22, 2019; 4 pages; US.
United States Patent and Trademark Office; PCT Written Opinion of the International Searching Authority, issued in connection to application PCT/US2017/045278; Nov. 2, 2017; 8 pages; US.
United States Patent and Trademark Office; PCT Written Opinion of the International Searching Authority, issued in connection with application No. PCT/US2019/025345; Jul. 22, 2019; 7 pages; US.
USCF, Daily Health Screening, Nov. 19, 2021; 3 pages.
VMWARE, Employee Experience When They Receive a Health Attestation Notification in Workspace One Intelligent Hub App, Sep. 1, 2021.
Waste Management, Inc et al.; Waste Management—Customer Communications; Te Ohio State University; 1 page; Apr. 14, 2019; U.S.
Waste Management: Customer Communication; Autumn 2018, Engineering 5901.01 Multidisciplinary Design Capstone; 265 pages; Dec. 7, 2018; U.S.
Wissenschaftszentrum Nordrhein-Westfalen; Analysis and Evaluation of the Possible Uses of Biomass; Aug. 1, 2005; http://www.biogaseinspeisung.de/download/Endberichet-Band3_FhG-IUSE.pdf; 236 pages; Germany.
Young, Ben et al.; A System for Standardizing and Combining U.S. Environmental Protection Agency Emissions and 7 Waste Inventory Data; Applied Sciences; Mar. 28, 2022; 16 pages.

* cited by examiner

| Potential End Markets for Recovered Resources | | | |
|---|---|---|---|
| **Material Type** | **Format** | **End Markets** | **Process** |
| PET Clear | Rigid | Bottles to Bottles | Mechanical |
| PET Color | Rigid | Textiles/Carpets/Advanced Molecular Recycling | Molecular Recycling |
| PET Thermoforms | Rigid | Trays/Textile/Carpets/Advanced Molecular Recycling | Mechanical/Advanced Molecular Recycling |
| HDPE Natural | Rigid | Food Packaging/Cosmetic Packaging/ Shampoo Bottles | Mechanical Recycling |
| HDPE Color | Rigid | Detergent Bottles/Drainage Pipes | Mechanical Recycling |
| PP Clear Food | Rigid | Food Packaging | Mechanical Recycling |
| PP Mixed Color Food | Rigid | Food Packaging | Mechanical Recycling |
| PP Mixed Color Non-food | Rigid | Pails/Buckets/Automotive | Mechanical Recycling/Advanced Recycling |
| EPS | Rigid | Protective Packaging/Construction/Cold Packaging /Food Service/Solvent Extraction | Mechanical Recycling /Solvent Extraction |
| PS | Rigid | Cups, Trays/Sovent Extraction | Mechanical / Solvent Extraction |

A B C D

FIG. 10

| A | B | C | D |
|---|---|---|---|
| PE Clear | Flexible | Bags, Non-Food Packaging, Advanced/Chemical Recycling | Mechanical (Offtake)/ Advanced Recycling/Solvent Extraction |
| PE Color | Flexible | Bags, Non-Food Packaging, AG Film Advanced/Chemical Recycling | Mechanical (Offtake)/ Advanced Recycling/Solvent Extraction |
| PP Clear | Flexible | Bags, Non-Food Packaging, Advanced/ Chemical Recycling | Mechanical/ Advanced Recycling/ Solvent Extraction |
| PP Color | Flexible | Bags, Non-Food Packaging, Advanced/ Chemical Recycling | Mechanical/ Advanced Recycling/ Solvent Extraction |
| Laminates, Multilayer, Bio-Degradable, Metallized | Flexible | Advanced/Chemical Recycling Feedstock/ Construction Block | Mechanical/ Advanced Recycling/ Solvent Extraction |
| All Residues | Mixed Format | Construction Block | Mechanical |

FIG. 10 (Continued)

PLASTICS PROCESSING AND PLASTICS RECOVERY FACILITY

CROSS REFERENCE TO RELATED APPLICATIONS

This application claims the benefit, and priority benefit, of U.S. Provisional Application 63/683,603 filed Aug. 15, 2024, the contents and disclosure of which are incorporated by reference herein in their entirety.

BACKGROUND

Field of Invention

This invention relates generally to sorting and recovery of materials in a combination of a plastics processing facility (PPF) and a plastics recovery or recycling facility (PRF).

Description of the Related Art

It is known in the art that plastics processing can be used to sort, grade and prepare mixed plastic waste fractions into separate fractions/polymers for onward use.

In general, there are different types of facilities for plastics processing. For example, a plastics recovery facility (PRF) takes a mix of plastics and segregates by resin type, while a plastics processing facility (PPF) focuses on cleaning inbound material and segregating resin in multiple fractions from color sort to food grade, etc. A plastics recovery facility (PRF) can sort plastics by type, as compared to a material recovery facility (MRF) which separates plastic and non-plastic or different grades of plastics but at a very high level and usually only the ones with mature markets. The material entering a PRF has typically been partially sorted in a previous plant process (such as a MRF) and is then presented to the PRF for further separation. The feed to the PRF is generally plastic materials such as PET, HDPE and PP along with various other materials and contaminants.

Extended producer responsibility (EPR) is a government policy approach that encourages companies to design more sustainable products and manufacturing processes and to undertake more efficient recycling efforts and that defines legislation for recycling targets for producers. PRF or PPF systems could ideally be utilized to meet requirements, but prior PRF or PPF systems have been inefficient, time-consuming and prohibitively expensive, and existing infrastructure does not allow systems to reach new EPR targets while being efficient.

Improvements to this technology and to existing approaches are therefore desired.

SUMMARY

Various illustrative embodiments of a system and method for plastics processing and recovery are described herein.

In certain illustrative embodiments, a system for plastics processing and recovery is provided. The system can include a first process stream configured to receive a first feed material and to recover polyethylene terephthalate (PET) from the first feed material; a second process stream configured to receive a second feed material and recover at least one selected from the group of polyethylene (PE), polypropylene (PP) and polystyrene (PS) and combinations thereof from the second feed material; a third process stream configured to receive a third feed material and recover plastics residuals from the third feed material; a fourth process stream configured to receive a fourth feed material and recover fines and glass residue from the fourth feed material; and a fifth process stream configured to receive a fifth feed material and recover flexible plastic packaging from the fifth feed material. The first process stream, the second process stream, the third process stream, the fourth process stream and the fifth process stream can all be located at the same facility site. In certain aspects, the first process stream, the second process stream, the third process stream, the fourth process stream and the fifth process stream are all located in co-operational proximity to each other at the same facility site. The third feed material can include at least one selected from the group of a recovery stream from the first process stream, a recovery stream from the second process stream, and a recovery stream from the fifth process stream and combinations thereof. The product yield of polyethylene terephthalate (PET) from the first feed material can be at least 80%, by weight percent. The product yield of polyethylene terephthalate (PET) from the first feed material can be in the range from 80%-98%, by weight percent.

In certain illustrative embodiments, a method of plastics processing and recovery is provided. A first feed material in a first process stream can be processed to recover polyethylene terephthalate (PET) from the first feed material. A second feed material in a second process stream can be processed to recover at least one material selected from the group of polyethylene (PE), polypropylene (PP) and polystyrene (PS) and combinations thereof from the second feed material. A third feed material in a third process stream can be processed to recover plastics residuals from the third feed material. A fourth feed material in a fourth process stream can be processed to recover fines and glass residue from the fourth feed material. A fifth feed material in a fifth process stream can be processed to recover flexible plastic packaging from the fifth feed material. In certain aspects, the first process stream, the second process stream, the third process stream, the fourth process stream and the fifth process stream are all located at the same facility site. The first process stream, the second process stream, the third process stream, the fourth process stream and the fifth process stream can all be located in co-operational proximity to each other at the same facility site. The third feed material can include at least one selected from the group of a recovery stream from the first process stream, a recovery stream from the second process stream, and a recovery stream from the fifth process stream and combinations thereof. The product yield of polyethylene terephthalate (PET) from the first feed material can be at least 80%, by weight percent. The product yield of polyethylene terephthalate (PET) from the first feed material can be in the range from 80%-98%, by weight percent.

BRIEF DESCRIPTION OF THE DRAWINGS

A better understanding of the presently disclosed subject matter can be obtained when the following detailed description is considered in conjunction with the following drawings, wherein:

FIG. 10 is a table showing a listing of potential end markets for recovered resources from an improved combination of plastics processing facility and plastics recovery facility, in accordance with an illustrative embodiment of the presently disclosed subject matter.

While certain preferred illustrative embodiments can be described herein, it can be understood that this description is not intended to limit the subject matter to those embodiments. On the contrary, it is intended to cover all alternatives, modifications, and equivalents, as may be included within the spirit and scope of the subject matter as defined by the appended claims.

DETAILED DESCRIPTION

The presently disclosed subject matter relates generally to sorting and recovery of materials in a combination of a plastics processing facility (PPF) and a plastics recovery or recycling facility (PRF).

The subject matter is described more fully hereinafter with reference to the accompanying drawings in which embodiments of the system and process are shown. The system and process may, however, be embodied in many different forms and should not be construed as limited to the embodiments set forth herein; rather, these embodiments are provided so that this disclosure can be thorough and complete, and can fully convey the scope of the system and process to those skilled in the art.

In certain illustrative embodiments, the presently disclosed system and method utilize advanced technology and machinery designed to sort and recover materials in a combination of a plastics processing facility (PPF) and a plastics recovery or recycling facility (PRF) while meeting or exceeding minimum quality specifications for the recovered materials.

Figure 1:
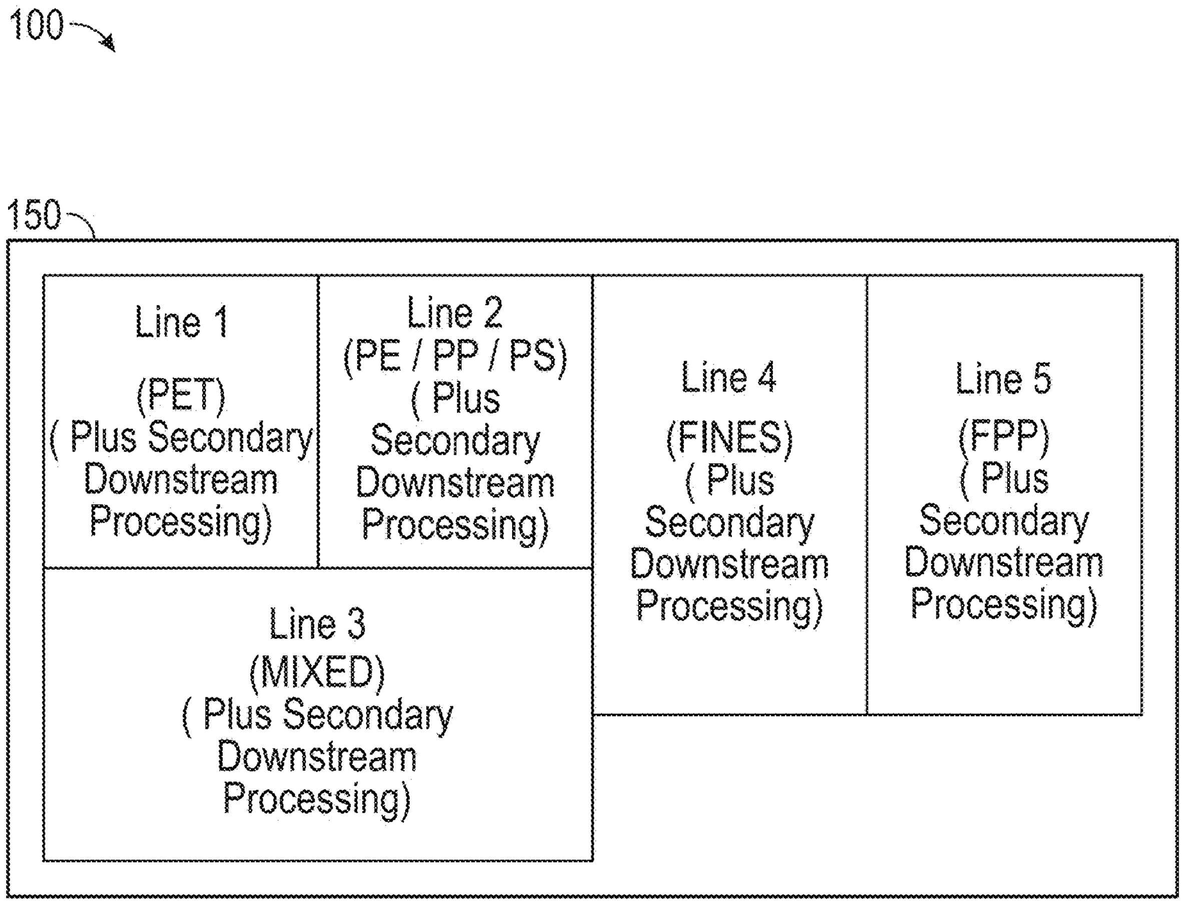
FIG. 1 is an overview of an improved combination of plastics processing facility and plastics recovery facility in accordance with an illustrative embodiment of the presently disclosed subject matter.

An overview of an improved system 100 comprising a combination of a plastics processing facility (PPF) and a plastics recovery or recycling facility (PRF) is shown in FIG. 1. In certain illustrative embodiments, at least five separate "lines" are utilized within system 100, each line comprising a separate process stream. Line 1 is a first process stream comprising a PET processing line. PET is polyethylene terephthalate, which is a plastic typically used in packaging materials for consumer products. Line 2 is a second process stream comprising a processing line for other grades of plastics such as PE, PP, and PS. Line 3 is a third process stream comprising a "catch-all" or "mixed" recovery line for treating residual from other lines as well as other MRF residue. Line 4 is a fourth process stream comprising a processing line for fines and glass residue. Line 5 is a fifth process stream comprising a FPP processing line. FPP is flexible plastic packaging such as plastic films, wraps, bags, and pouches, each line to have a dedicated collaborator.

In certain illustrative embodiments, system 100 provides a solution for integration and treating each of Line 1, Line 2, Line 3, Line 4 and Line 5 that are co-located on the same physical footprint (for example, under one roof and/or on a single campus) to process recovered plastics thus creating economies of scale and efficiency. The various lines and recycling functions of system 100 can be co-located on the same property or site in close co-operational proximity to each other while considering efficiency and scale considerations. For example, the property boundaries can be defined by a physical footprint 150, which can include, for example, a building, a property line, a structure, a work site, etc. While physical barriers such as walls, separate buildings, fence lines, roads, easements, etc. may exist on or within the footprint 150 of system 100, that is not necessarily the case, with the key feature being that the equipment associated with Line 1, Line 2, Line 3, Line 4 and Line 5 can all generally be located in close co-operational proximity to each other to comprise a plastics processing facility (PPF) capable of meeting or exceeding minimum material quality specifications.

While the illustrative embodiment of FIG. 1 shows Line 1, Line 2, Line 3, Line 4 and Line 5 oriented in specific locations within the boundaries of defined physical footprint 150, the presently disclosed subject matter is not limited to the exact orientation of locations shown in FIG. 1. To the contrary, in various illustrative embodiments, Line 1, Line 2, Line 3, Line 4 and Line 5 of system 100 can be oriented in a variety of different locations within the boundaries of defined physical footprint 150 (e.g., to meet design or cost concerns or material quality specifications) without departing from the scope and spirit of the presently disclosed subject matter.

Moreover, in certain illustrative embodiments as shown in FIG. 1, each of Line 1, Line 2, Line 3, Line 4 and Line 5 within the footprint 150 of system 100 can also include processes and equipment for secondary downstream processing (S.D. P.) and transformation by the user and/or an associated collaborator into a recovered resource ready for the end market. Examples of potential recovered resources include, without limitation, Fe, NFe, fiber, pellets and flakes.

In certain illustrative embodiments, system 100 is designed to accept input streams with materials such as (but not limited to) all rigids and flexible grades of plastics being directed to the appropriate lines. In the event that contamination in a bale of input material is too high, there can be flexibility to direct that bale to a mixed packaging line such as Line 3 (see FIG. 5 and FIG. 6) to guarantee recovery of good material, and to avoid sending material to disposal or take away capacity from another main line.

In certain illustrative embodiments, each front-end process of system 100 can have a minimum product yield, material for material, in a range of at least about 80%-98% by weight percent for rigid and flexible plastics, and purity can be in a range of at least about 80%-98% by weight percent. These performance yields can be based on known inbound material characterization to feed each individual line. Based on information received from secondary processors and with the understanding of quality produced by the front-end process, it can be expected that the secondary processes would yield, material for material, greater than about 80-95% by weight percent and considering that residual material could be recaptured by other lines or processes, overall yield may even be higher. Study and evaluation are ongoing to further develop processes that achieve these ranges (and beyond) and further maximize yield and purity.

In certain illustrative embodiments, system 100 can utilize multiple front-end processes in Lines 1-5 to accommodate different material bales/streams (which can be loose) with all processes designed to maximize flexibility, recovery and purity. By maximizing these processes, circularity of material can be increased as opposed to have a single recycling cycle. Moreover, higher valued resources can be recovered to increase potential revenue if producers elect to put material into market as opposed to reuse in their own products. The presently disclosed subject matter comprising having all processing in system 100 co-located on the same physical footprint 150 can reduce overall system costs and reduce greenhouse gas (GHG) emissions on top of facilitating the increase of overall recovery rates.

In certain illustrative embodiments, system 100 can have the following advantages and benefits: (i) high recovery rate for all material grades; (ii) high purity on recovered material providing access to high value end markets; (iii) increased material circularity; (iv) better traceability of each material grade; (v) increased yield and unit utilization for down steam processes; (vi) increased operational efficiency; (vii) reduced overall system cost including CapEx and OpEx; (viii) increased logistic efficiency; (ix) reduced carbon footprint and water consumption; and (x) enables flexibility and scalability.

In certain illustrative embodiments, system 100 can have the following additional features and advantages: (i) efficiency in terms of logistics, higher recovery rate and yield; (ii) specific configurations and layouts of the process flow to enhance recovery; (iii) residual plastics streams from the individual recovery streams are routed to their respective recovery loop (for example, PE residues from PET recovery loop routed to PE loop); (iv) on-purpose design to meet the needs and specifications of the individual end markets; (v) recovery of flexible films, multi-layer and laminated films; (vi) ability to separate LDPE and LLDPE from mixed flexible streams to increase value; (vii) color sorting before flaking; and (viii) de-labeling before shredding.

Illustrative embodiments of process flow diagrams for the various lines in system 100 are shown in FIGS. 2-7 herein. These process flow diagrams may include a plurality of sequential, non-sequential, or sequence independent steps or stages using, for example, the systems and equipment shown or described herein.

Figure 2:
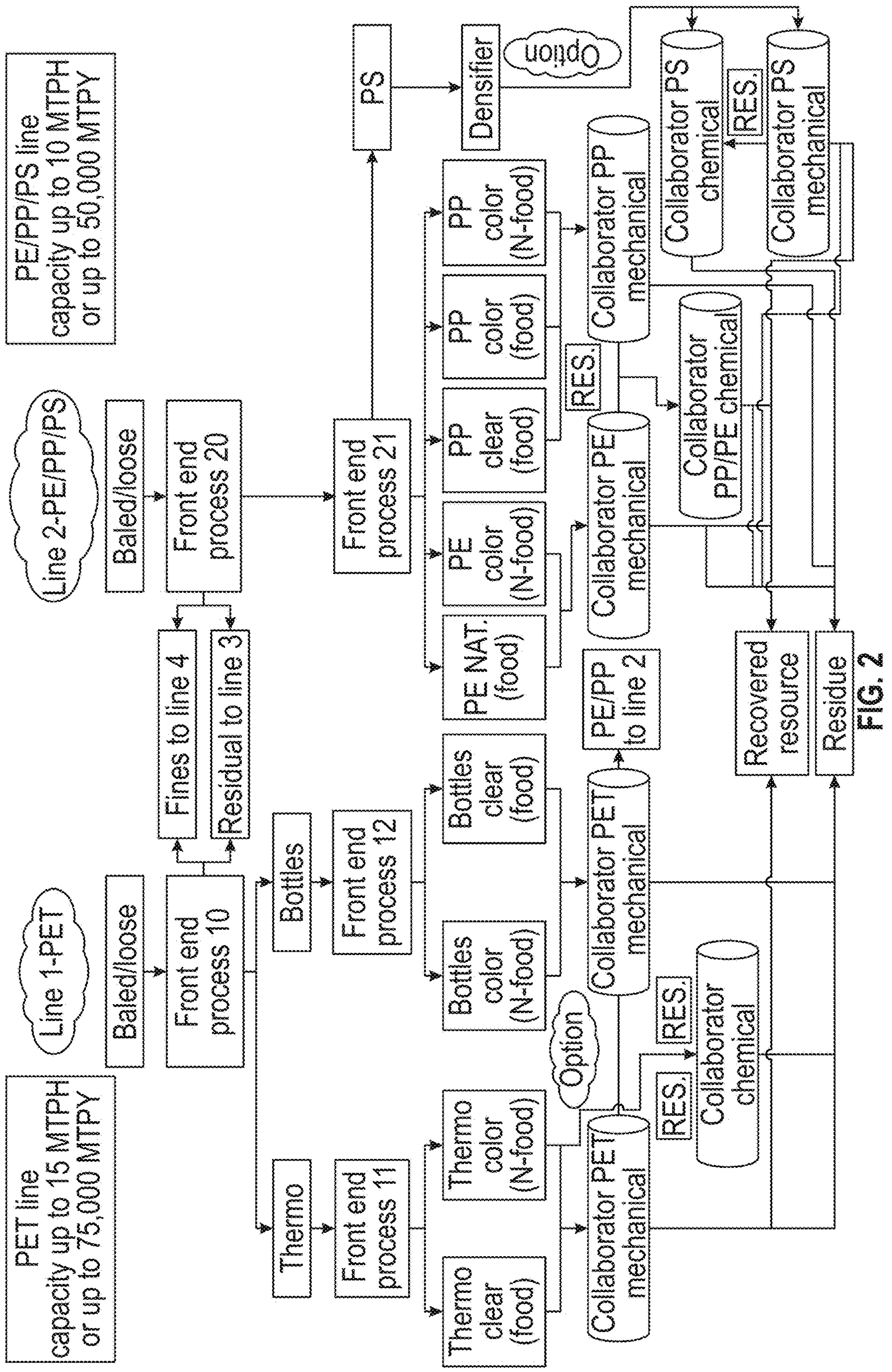
FIG. 2 is a process flow diagram of a PET processing line and a processing line for other grades of rigid plastics such as PE, PP, and PS in an improved combination of plastics processing facility and plastics recovery facility, in accordance with an illustrative embodiment of the presently disclosed subject matter.

Illustrative embodiments of process flow diagrams for Line 1 and Line 2 of system 100 are shown in FIG. 2.

In certain illustrative embodiments, Line 1 is a PET processing and recovery line. PET is polyethylene terephthalate, which is typically used in packaging materials for consumer products. Line 1 also produces a residual stream that can be sent to a chemical recycler. The PET processing and recovery line can include a plurality of separate front-end processes, including a first front-end process 10, a second front-end process 11, and a third front-end process 12.

Figure 3:
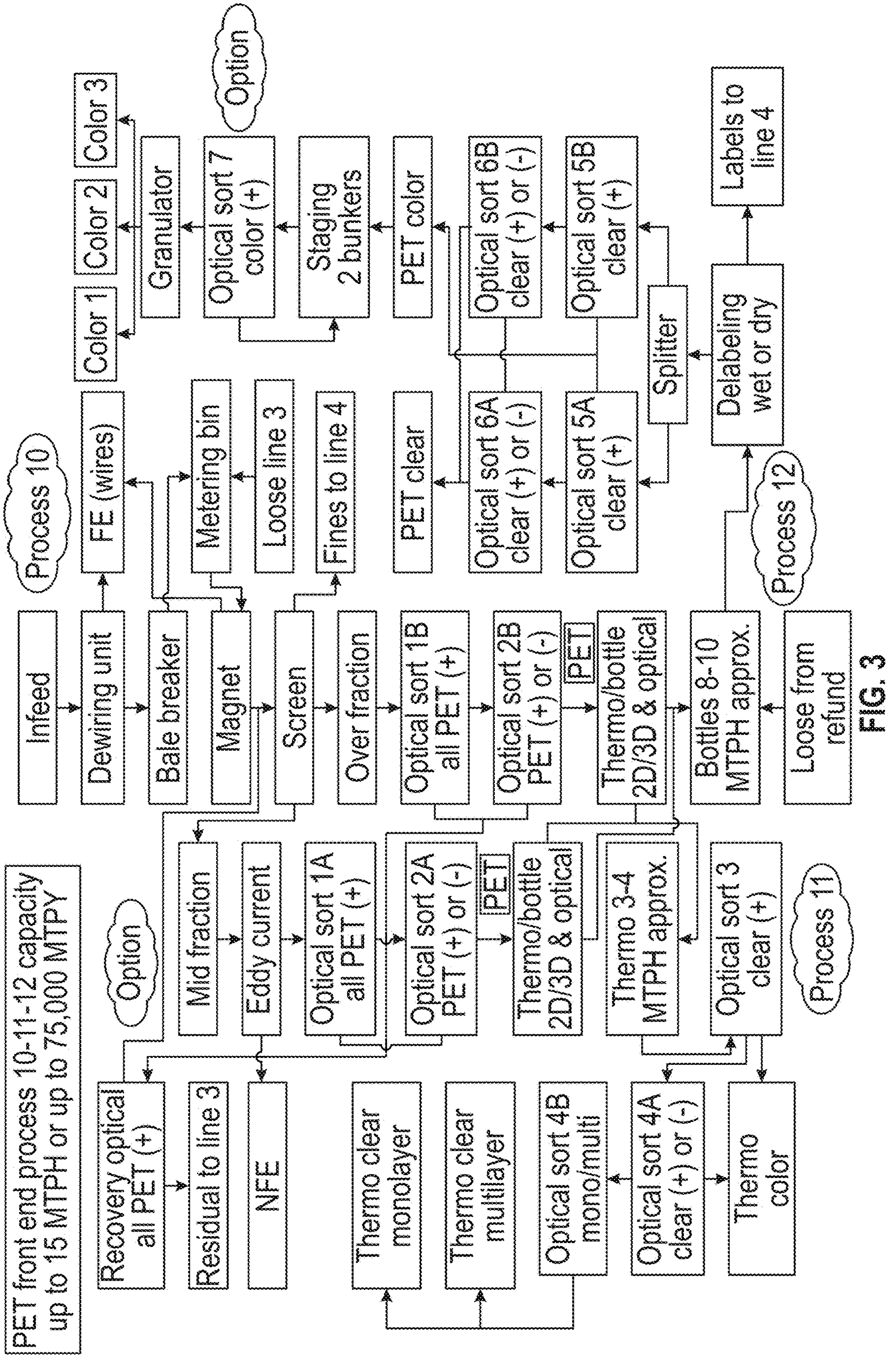
FIG. 3 is a process flow diagram of a first front-end process line, a second front-end process line and a third front-end process line in a more detailed version of a specific section from the PET line of FIG. 2 in an improved combination of plastics processing facility and plastics recovery facility, in accordance with an illustrative embodiment of the presently disclosed subject matter.

An illustrative embodiment of front-end process 10 of Line 1 is shown in FIG. 3. In certain illustrative embodiments, the front-end process 10 of Line 1 can be designed to accept either baled or loose material. For areas or provinces with refund programs, loose bottles can be introduced at the beginning of front-end process 12.

In certain illustrative embodiments, the front-end process 10 of Line 1 can have a long infeed conveyor with sufficient capacity to enable forklift operators to support multiple lines at once. Feed bales can pass through a de-wiring unit and bale breaker, and any loose material can be introduced after these two steps. All loose material can be stored in a metering bin to feed the process in a homogenous fashion. After iron (Fe) removal, material can be screened via multiple sizing screens of different types (depending on targeted size) to create a small fraction (50 mm minus) directed to Line 4 for further processing, a medium fraction (50-150 mm) and an over fraction (>150 mm) to not only reduce the range of material size equipment needed to focus on and increase recovery and purity but to also apply the proper technologies on each size fraction.

In certain illustrative embodiments, the medium fraction (50<x<150 mm) sort line can have an eddy current to remove any nonferrous (aluminum) material that could be in the stream, and the material can then go through a series of optical sorters to extract only PET material from the stream.

In certain illustrative embodiments, an optional recovery unit can be used to maximize each line's capacity, and any remaining material can be directed to Line 3, the mixed packaging line, to recover any lost yield and any other material.

In certain illustrative embodiments, depending on secondary processor requirements and end market needs, the line of front-end process 10 is designed to be 100% positive sorting to increase purity, or a combination of positive and negative to increase recovery at first pass. The overs (>150 mm) can follow the same steps except this line will not have an eddy current due to material size. The resulting line from front end process 10 can be segregated between thermoform PET and bottle PET using a combination of 2D/3D separation and an optical sorter with AI with redundancy to increase recovery of each fraction as well as purity. In certain illustrative embodiments, to increase overall system recovery, all residual from front end process 10 can be redirected to Line 3 to recover not only missed PET but all other resins that would be considered contamination in a PET bale.

An illustrative embodiment of front-end process 11 of Line 1 is shown in FIG. 3. Front end process 11 of Line 1 is focused on the thermoform stream. Thermoforming is a manufacturing process where a plastic sheet is heated to a pliable forming temperature, formed to a specific shape in a mold, and trimmed to create a usable product. There is long-term strategy value in front-end process 11 of system 100 having the flexibility of segregating thermoform by color to ultimately reproduce trays from mechanical processing based on clear versus opaque, with clear fractions being further segregated between monolayer versus multilayer.

An illustrative embodiment of front-end process 12 of Line 1 is shown in FIG. 3. Front end process 12 of Line 1 is focused on bottles, and the stream includes additional processing steps compared to front-end process 10 and front-end process 11. For example, step one of the bottle recovery of Line 1 is de-labeling and depending on the end user needs and final end market target, this could be a wet or dry approach. In certain illustrative embodiments, labels can be redirected to Line 4 to be recovered depending on material type. To increase recovery and purity, based on potential volume to be processed per site, material could be split into two lines of optical sorters. The two lines can separate clear bottles from colored ones via a 2-step approach. There can also be a secondary step of increasing recovery or purity based on end market needs.

In certain illustrative embodiments, depending on end user needs, recovery for front-end process 12 can be targeted, and flake sorting can be used to reach quality needs and create more circularity in the overall system—a bottle-to-bottle concept. Also, in certain illustrative embodiments colored PET can be segregated into different colors to increase material value while using a batch process to reduce CapEx.

In certain illustrative embodiments, once material goes through either front-end process 11 or front-end process 12, the material is then ready for secondary downstream processing and transformation into a recovered resource ready for the end market. The material can be stored by, i.e., grinding material and placing it in silo. Regarding PET processing, any PE/PP that is in the stream (bottle caps) can be isolated and redirected to the corresponding processing line, Line 2. The remaining residual is also to be redirected to other mechanical or chemical collaborators.

In certain illustrative embodiments, a buffer zone can exist on any line between a front-end process and secondary downstream processing in system 100. The buffer zone can provide several key benefits. One benefit is enhanced efficiency. By storing processed materials in a controlled environment, a steady and consistent supply of material is ensured. This minimizes downtime and allows for smoother transitions between different stages of processing. Another benefit is flexibility. The buffer zone allows a user to manage fluctuations in material supply and demand more effectively. It also allows a user to accumulate and store materials when they are available, ensuring adequate inventory to meet processing needs even during periods of high demand or unexpected delays. Still another benefit is quality control. Storing ground material in silos helps maintain its quality and prevents contamination. The buffer zone can be equipped with monitoring systems to ensure that stored materials meet required specifications and are kept in optimal conditions. Another benefit is streamlined operations. By having a dedicated space for material storage, the flow of materials can be organized and managed. This reduces the risk of bottlenecks and enhances overall operational efficiency.

In certain illustrative embodiments, the proposed process flow for system 100 provides an opportunity for maximum closed-loop recovery of all streams. For example, labels are recovered through being routed to Line 4. Recovery is most efficient when all processes are co-located on the same physical footprint 150.

In certain illustrative embodiments, Line 2 is a processing line for other grades of rigid plastics such as PE, PP, and PS. As with Line 1, Line 2 can also include a plurality of separate front-end processes, including a first front-end process 20 and a second front end process 21 that would process material and then send the material to the appropriate line.

Figure 4:
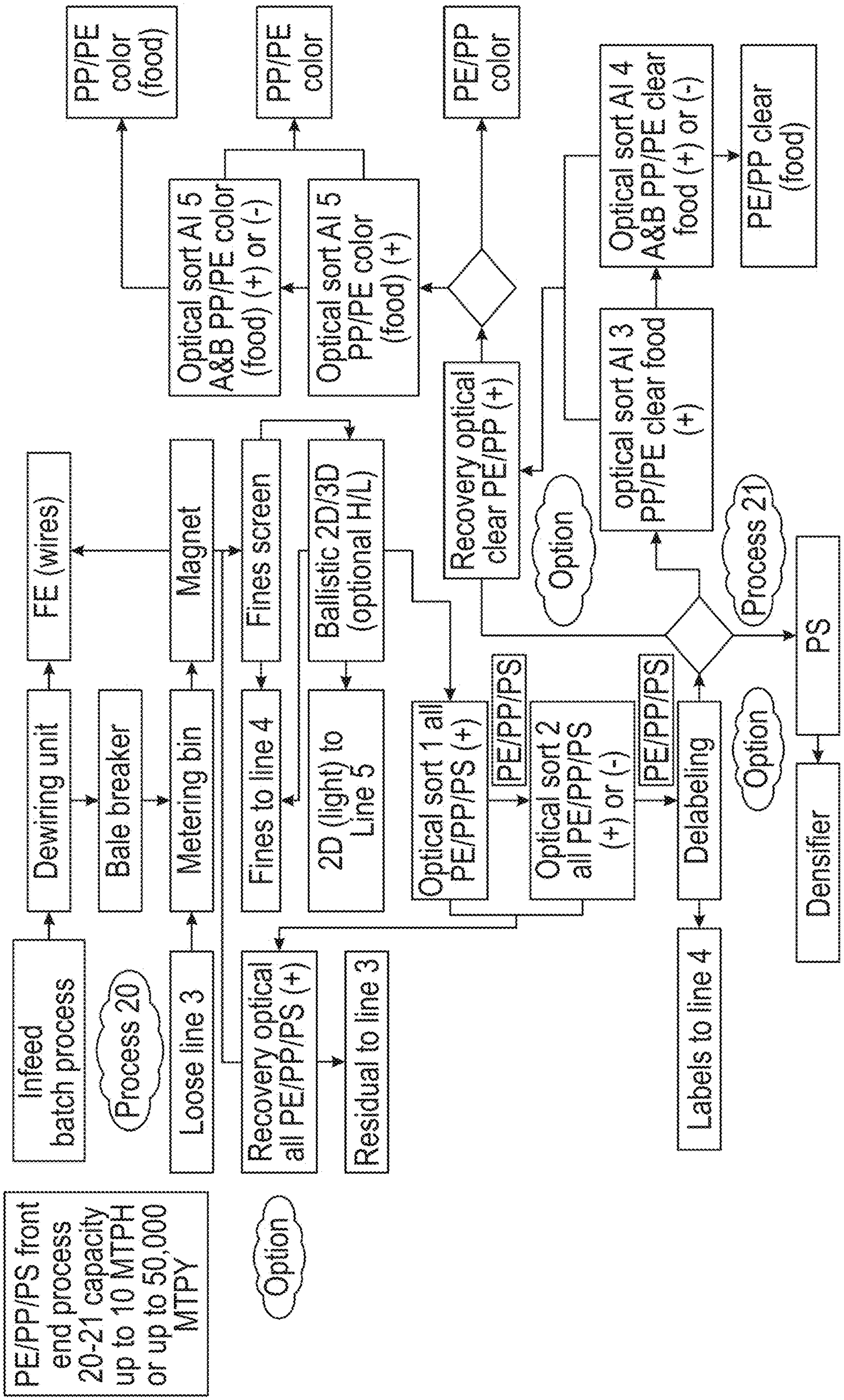
FIG. 4 is a process flow diagram of a first front-end process line and a second front-end process line in a more detailed version of a specific section from the PE/PP/PS line of FIG. 2 in an improved combination of plastics processing facility and plastics recovery facility, in accordance with an illustrative embodiment of the presently disclosed subject matter.

An illustrative embodiment of front-end process 20 of Line 2 is shown in FIG. 4. Similarly to Line 1, the front-end process 20 of Line 2 is designed to accept baled or loose material. Given that Line 2 is designed to process three types of inbound streams, that is, PE, PP and PS rigids, material can be fed in a batch process for each type with the integration of a staging/buffer zone for each material prior to secondary processing. System controls can have pre-established recipes for each grade to maximize recovery and purity. This single line approach presents the advantage of reducing overall project cost.

In certain illustrative embodiments, front end process 20 can include a long infeed conveyor with sufficient capacity to enable forklift operators to support multiple lines at once. Bales can then go through a de-wiring unit and bale breaker, and any loose material can be introduced after these two steps. All loose material can be stored in a metering bin to feed the process in a homogenous fashion. After iron (Fe) removal, the material can be conveyed to a fines screen to remove 50 mm minus material, and this fraction can be redirected to Line 4 for further processing and recovery. The overs from the fines screen can then be separated into 2D and 3D fractions via a ballistic screen to remove any FPP or 2D material that may be in the bales. Fines from this screen can be directed to Line 4 while the 2D fraction, with a majority being FPP, can be directed to Line 5. The 3D fraction can then go through a 2-stage optical sorting approach with the first unit positively sorting targeted material (PP/PE/PS) while the second unit can have flexibility to either eject targeted material or contamination to focus on quality or recovery depending on end market requirements. A high purity approach is preferable if food grade end market is selected to increase circularity of the overall system. An option can be selected for the residuals from this 2-stage process to add a recovery unit for targeted material to maximize capacity of each line. Residual from this front-end process 20 can be redirected to Line 3 to recover any missed PE, PP or PS as well as any other resins, metals or fiber to once again, thereby increasing overall system recovery.

In certain illustrative embodiments, after this preliminary process, all material can go through a de-labeling unit prior to entering front end process 21. This step can increase sorting performance of front-end process 21, which is focused on color sorting and food grade quality.

An illustrative embodiment of front-end process 21 of Line 2 is shown in FIG. 4. The first step of front-end process 21 is a 3-stage optical/AI sort to extract clear food grade material from the inbound stream. The 3-stage approach is meant to reach very high purity food grade material. Extracting clear food grade for specific applications allows for true circularity as well as increase the value of the recovered resource. In this approach, the first two units are focused on positive sorting while the third unit has flexibility to either sort positively or negatively.

In certain illustrative embodiments, an optional optical/AI sorter could be integrated on the residual of the 3-stage approach to increase clear food grade material recovery. The next step in front-end process 21 is focused on colored food grade material using once again the same 3 stage approach with an optical/AI sorter to produce a high purity colored food grade material. Residual from this process can be qualified as colored PP or colored PE, non-food grade. The AI aspect can require teaching distinguishing of images (e.g., bottles versus a laundry basket), which are the same type of plastics but different configuration and shapes. Different cameras can be used to read the shapes of the material (2D vs. 3D) and then comparing to a database of known objects.

In certain illustrative embodiments, all segregated categories of rigid PE, PP and PS from front-end process 20 and front-end process 21 can be stored in storage silos awaiting further processing. Silos capacity can be designed to also accommodate batch processing. In the event PS processing is off-site, a densifier can be incorporated to reduce transportation cost.

In certain illustrative embodiments, Line 2 can separate PP streams into high purity PP clear food, PP color food, and PP color non-food grades thereby providing feedstocks that can enhance the value and produce PP to be used in food packaging and other higher value applications. The PP stream of Line 2 is designed with three-stage sorting to be 100% positive sorting to increase purity or a combination of positive and negative to increase recovery at first pass depending on end market needs.

In certain illustrative embodiments, Line 2 can also separate PE streams into high purity PE clear food and PE color non-food grades thereby providing feedstocks that can enhance the value and produce PE to be used in food packaging and other higher value applications. The PE steam of Line 2 is designed with three-stage sorting to be 100% positive sorting to increase purity or a combination of positive and negative to increase recovery at first pass depending on end market needs.

In certain illustrative embodiments, Line 2 can also separate PS streams into high purity EPS and rigid PS food grades thereby providing feedstocks that can enhance the value and produce EPS and rigid PS to be used in mechanical and chemical recycling in higher value applications. The PS stream of Line 2 is designed with two stage sorting to be 100% positive sorting to increase purity or a combination of positive and negative to increase recovery at first pass depending on end market needs.

Figure 5:
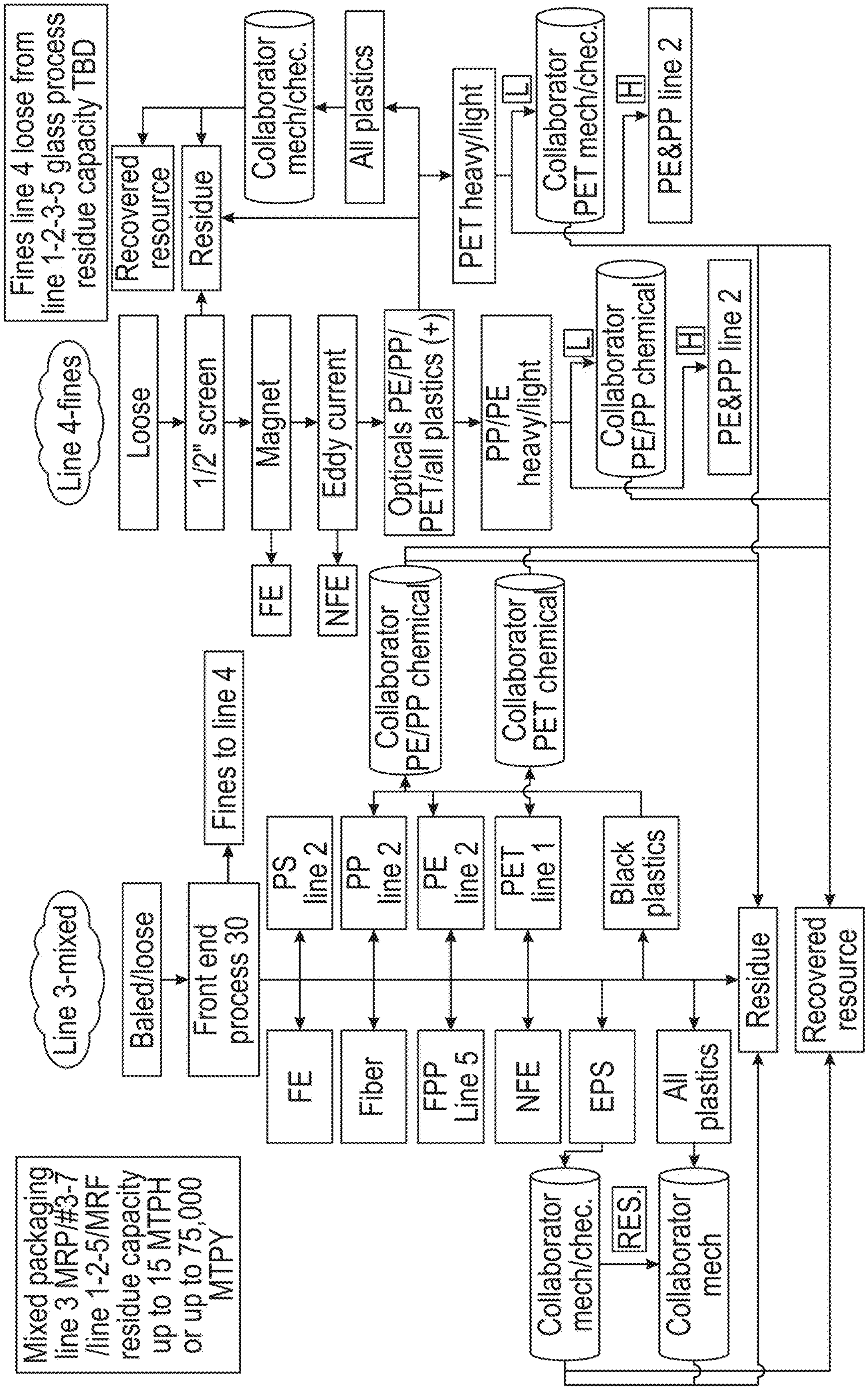
FIG. 5 is a process flow diagram of a "catch all" or "mixed" recovery or supplementing line and a fines and glass residue line in a PRF, also designed for MRF residue and to direct material to the proper PPF, in an improved combination of plastics processing facility and plastics recovery facility, in accordance with an illustrative embodiment of the presently disclosed subject matter.

A process flow diagram for Line 3 of system 100 is shown in FIG. 5. In certain illustrative embodiments, Line 3 is a "catch all" line, meaning that the various front-end processes in system 100 can send un-yielded material to Line 3 as a recovery or supplementing line. For example, if PET is not recovered from Line 1, then Line 3 can be used to recover such PET material to make sure that recovery is increased. Line 3 can also be used for MRF residue processing.

In certain illustrative embodiments, Line 3 can receive residual streams from Line 1, Line 2 and Line 5 to increase recovery as well as process mixed packaging bales of #3-7 or #1-7 bales from PCF/MRF, Mixed Rigid Plastic "Bulky" or MRP from those same PCF/MRF, as well as process MRF residue for those with low recovery. Line 3 offers the flexibility to increase overall extended producer responsibility (EPR) system recovery and support meeting legislation targets. Line 3 also provides a potential cost reduction for any new MRF/PCF or retrofits of existing ones because Line 3 can extract all necessary commodities and redirect them to secondary processors located on the same physical footprint 150.

In certain illustrative embodiments, baled material in Line 3 can go through an identical approach as Line 1 and Line 2 with a long staging conveyor, de-wiring and bale breaking and then any loose material can be introduced to a metering bin.

Figure 6:
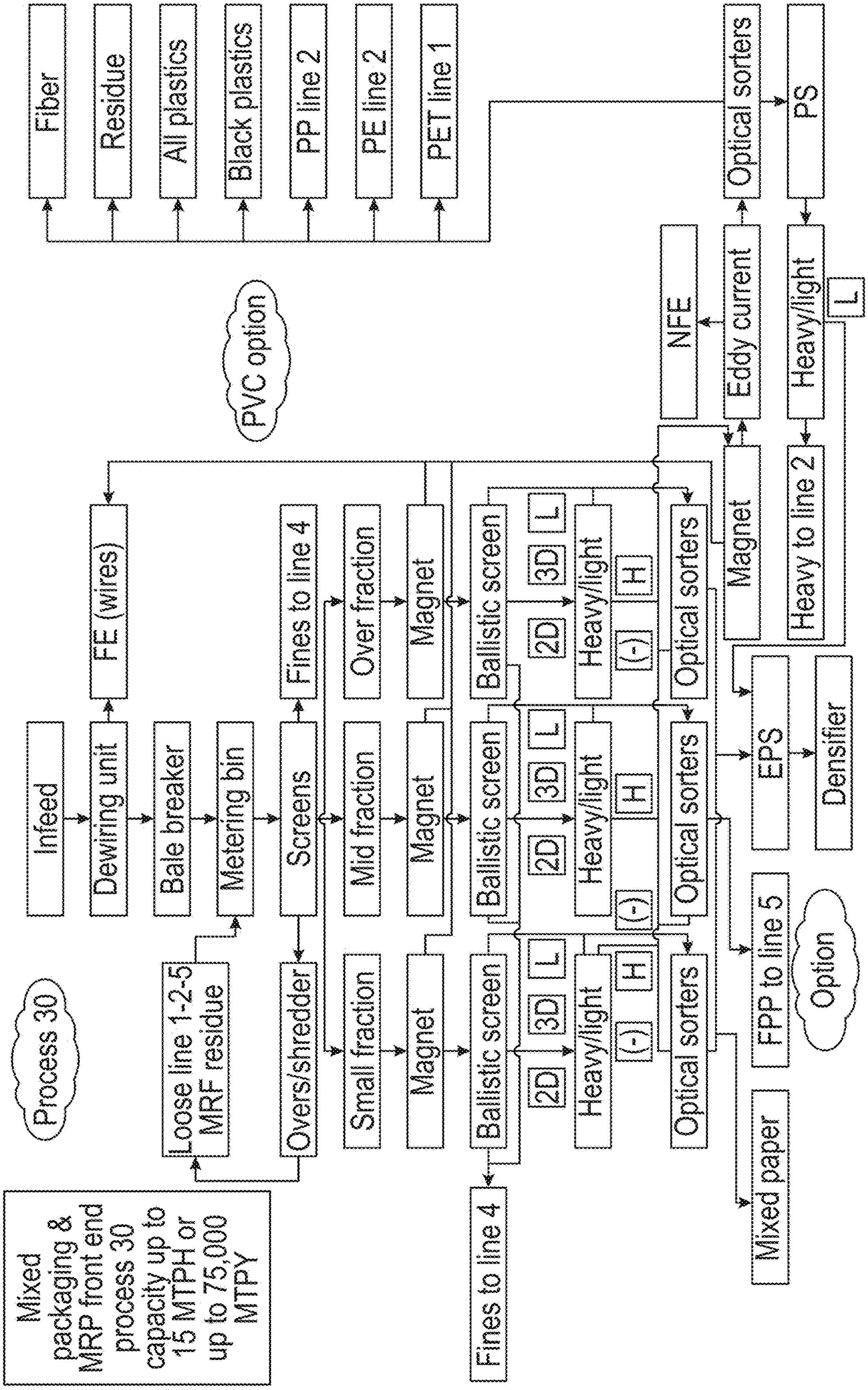
FIG. 6 is a process flow diagram of a front-end process line from the "catch all" or "mixed" line in a more detailed version of a specific section of FIG. 5 in an improved combination of plastics processing facility and plastics recovery facility, in accordance with an illustrative embodiment of the presently disclosed subject matter.

An illustrative embodiment of front-end process 30 of Line 3 is shown in FIG. 6. Like other lines in system 100, a recipe based on inbound material characterization can be established to maximize each step of front-end process 30. In certain illustrative embodiments, the first step of front-end process 30 is size separation of inbound streams into five different sizes not only for volume distribution but to also apply proper technology to each fraction as well as increase performance of the technology by working on a smaller size range. In certain illustrative embodiments, fines (50 mm minus) can be directed to Line 4 and any overs (300 mm plus approx.) can be directed to a size reducer. The other size fractions (small, medium and large) can each have a magnet to extract iron (Fe) material from the stream and then to a 2D/3D separation using a ballistic screen per size fraction. Fines material from ballistic screens can also be directed to Line 4 while 3D fractions can go through a heavy/light separator.

In certain illustrative embodiments, light fractions can be combined with 2D fractions from the ballistic screens and go through a series of optical sorters (one per size fraction) to extract fiber to be baled. FPP can go to Line 5 and EPS (expanded polystyrene, also known as Styrofoam) can proceed to the collaborator. The remaining material can rejoin 3D fractions into a single line. This final sorting line can go under a magnet for ferrous extraction, then an eddy current for non-ferrous removal and finally, a series of optical sorters for the following extractions: PET to Line 1, PE and PP separately to Line 2, fiber and PS to be separated into PS to go to Line 2 and EPS to go to the collaborator, recovery units for #1,2,5, black plastics (typically due to the addition of carbon black) to be further processed and a final catch-all plastics to go to the collaborator. PVC extraction is also an option if desired. Any residual from this line can be considered final residue. In the event EPS processing is off-site, a densifier can be incorporated to reduce transportation cost.

In certain illustrative embodiments, once black plastics are segregated, MIR technology can be used to further segregate this plastic stream by resin type to be either redirected to the proper line and associated collaborator or directly to the chemical associated collaborator. Key advantages of the mixed packaging processing line are: (i) allows additional recovery of plastic stream from MRF residues; (ii) recovery of black plastics by material type; and (iii) ability to separate PVC. Recovery of plastic streams is increased, and with synergy of co-locating lines on the same physical footprint 150, individual streams can be routed to their respective processing lines thereby increasing purity and recovery.

Figure 7:
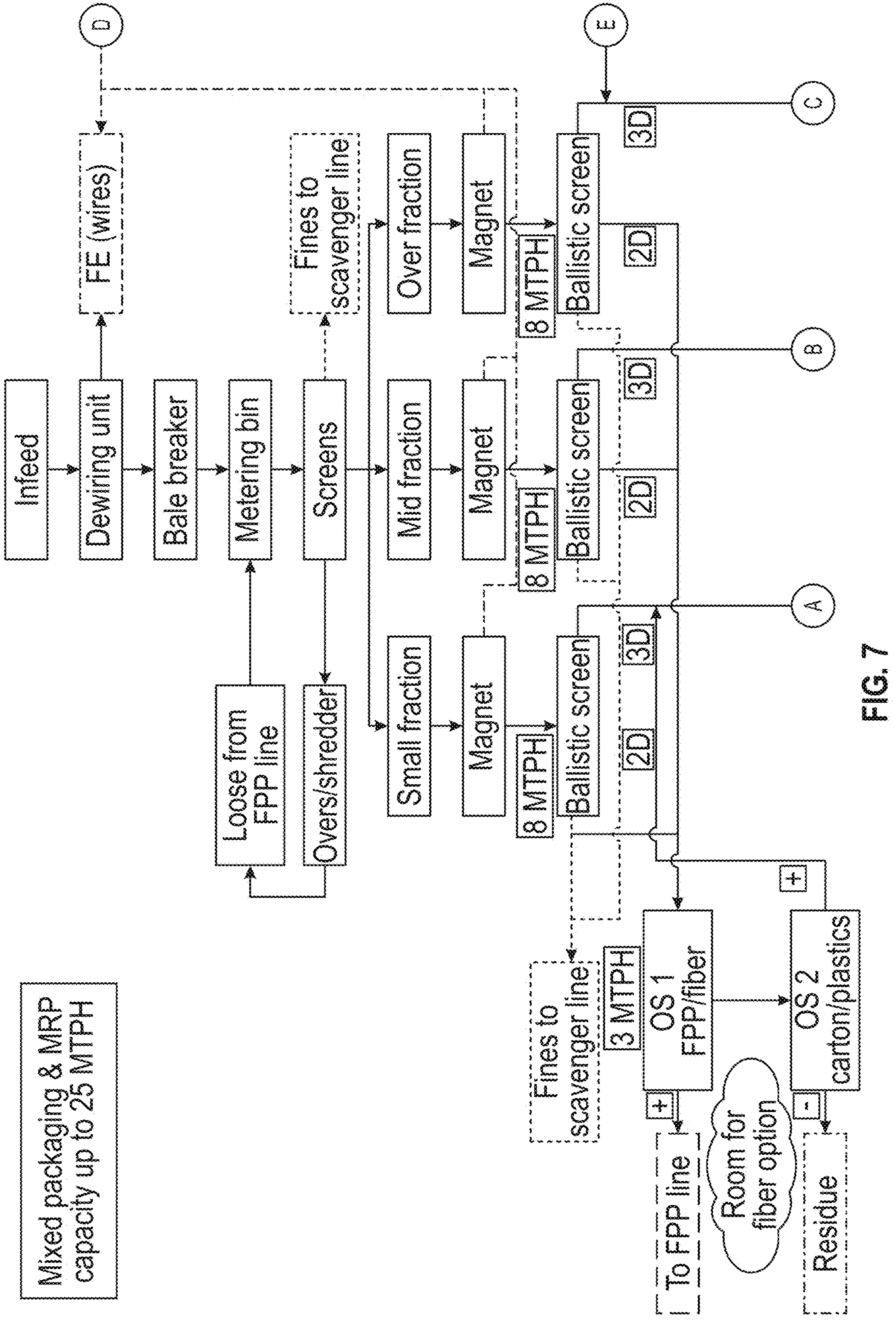
FIG. 7 is a process flow diagram of an alternative design for a "catch all" or "mixed" recovery or supplementing line in an improved combination of plastics processing facility and plastics recovery facility, in accordance with an illustrative embodiment of the presently disclosed subject matter.
Figure 7:
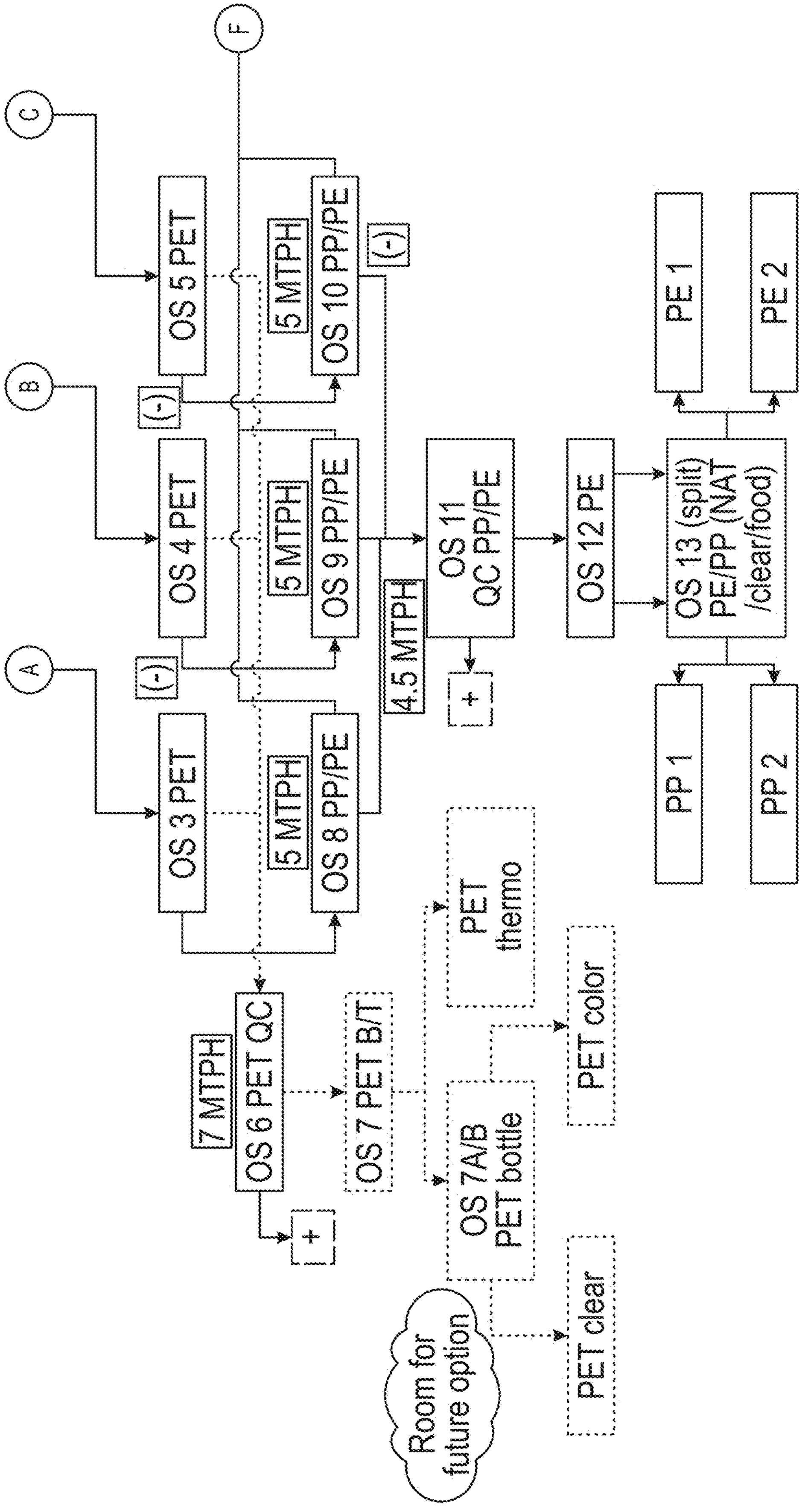
Figure 7:
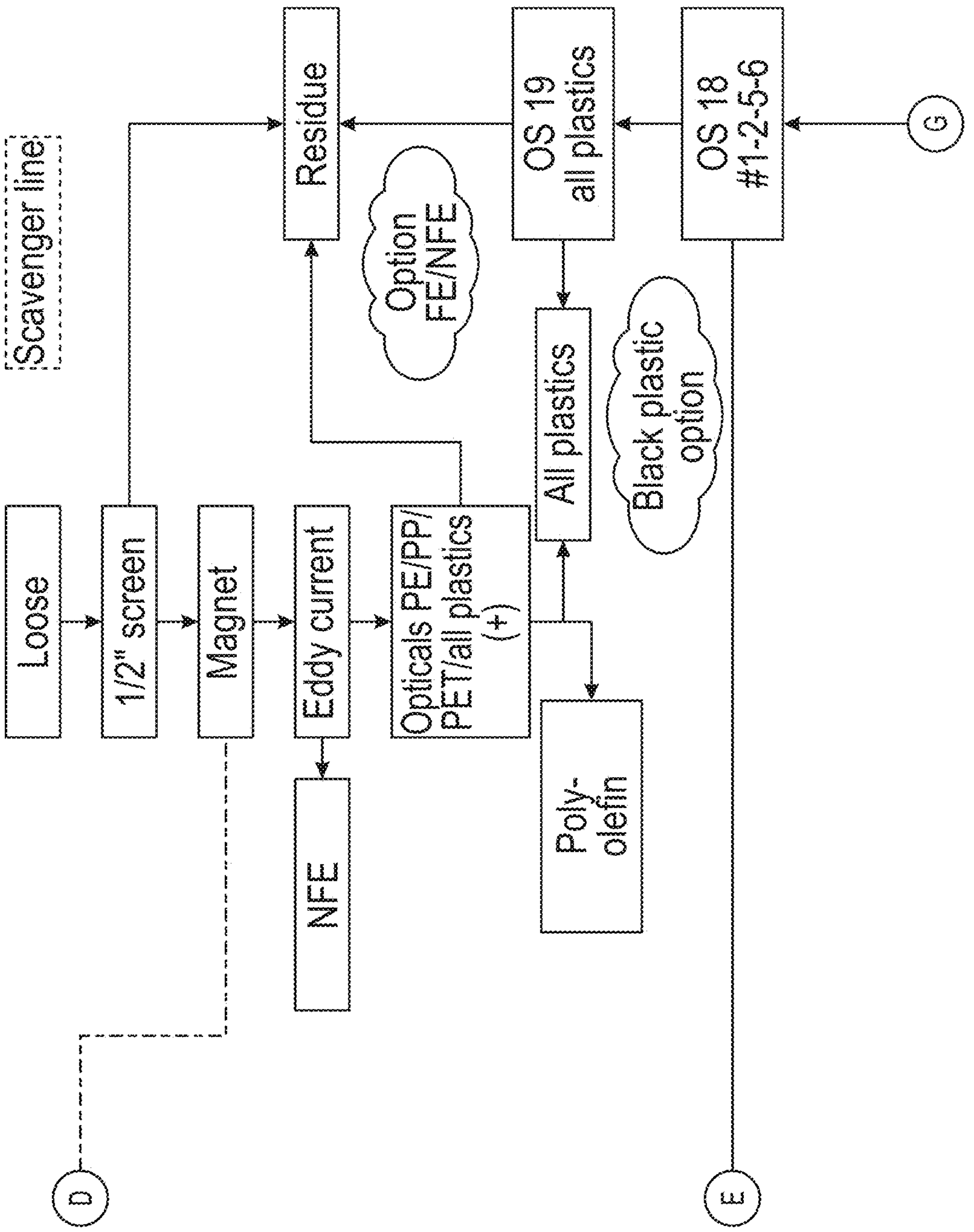
Figure 7:
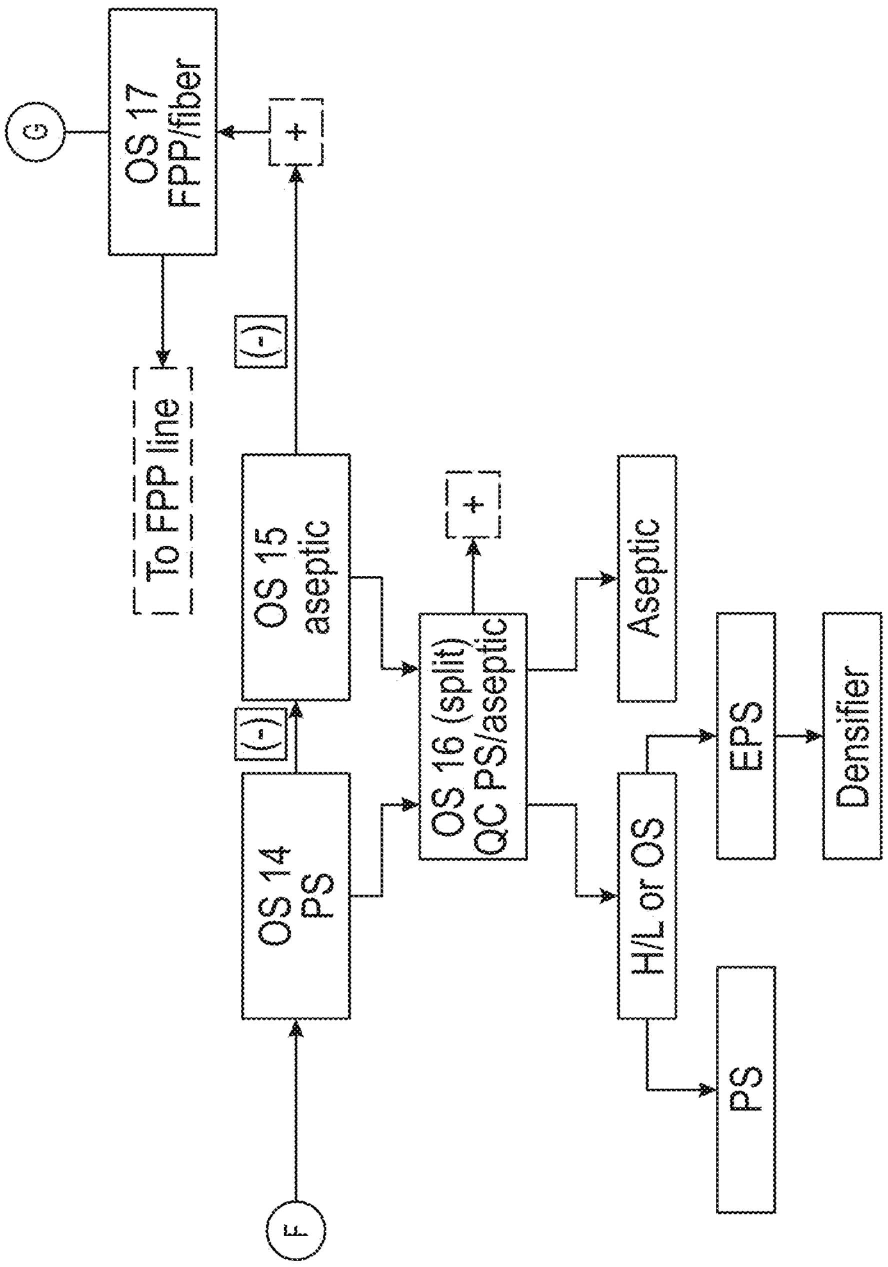

A process flow diagram for an alternative design for a "catch all" or "mixed" recovery or supplementing line in an improved combination of plastics processing facility and plastics recovery facility is shown in FIG. 7. In the alternative design, the mixed rigid line has been altered/expanded to achieve similar sorting while reducing cost.

Referring back to FIG. 5, an illustrative embodiment of a process flow diagram for Line 4 of system 100 is shown. In certain illustrative embodiments, Line 4 can be used for glass residual processing. Line 4 is designed to receive 50 mm minus from all other process lines (Lines 1-2-3-5) as well as residue from a MRF glass processing plant with the intent of capturing multiple small size packaging from, for example, coffee capsules to plastics bottle caps and candy wrappers by material types. This processing can also contribute to achieving overall legislation targets for material recovery with some processes having up to 5% of 50 mm in the stream. The majority (if not all) of the inbound streams can be coming loose and be blended on the tip floor to assure homogeneity of material to be processed. Blended material can be loaded into a metering bin to feed system in continuous fashion. A first step in the process is the removal of 12 mm minus material that is currently considered residue. Overs of the 12 mm screen can go through Fe and NFe removal using a combination drum magnet and high frequency eddy current and then go through a series of optical sorters to extract PE, PP, PET and an all-plastics category. This all-plastics category can be processed by onsite or offsite mechanical and/or chemical collaborators. Each resin (PE, PP and PET) can have its own heavy/light separation to isolate rigids from flexibles. The rigid fraction can be directed to a respective line and introduced at the proper step while the light fraction can be directed to a designated collaborator. The light fraction, depending on material type, can be directed to onsite or offsite mechanical and/or chemical collaborators.

Figure 8:
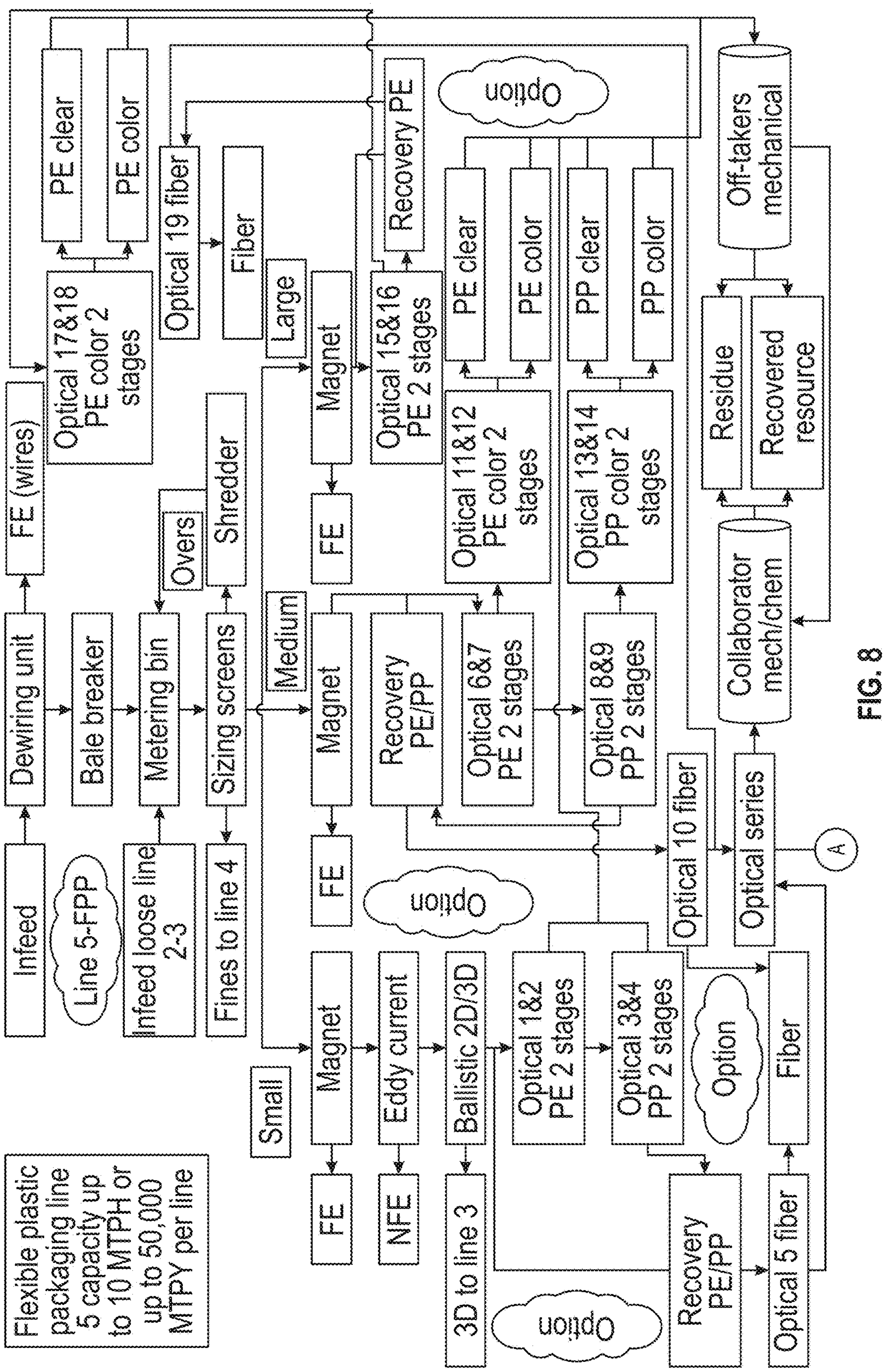
FIG. 8 is a process flow diagram of a flexible plastics packaging (FPP) line in an improved combination of plastics processing facility and plastics recovery facility, in accordance with an illustrative embodiment of the presently disclosed subject matter.
Figure 8:
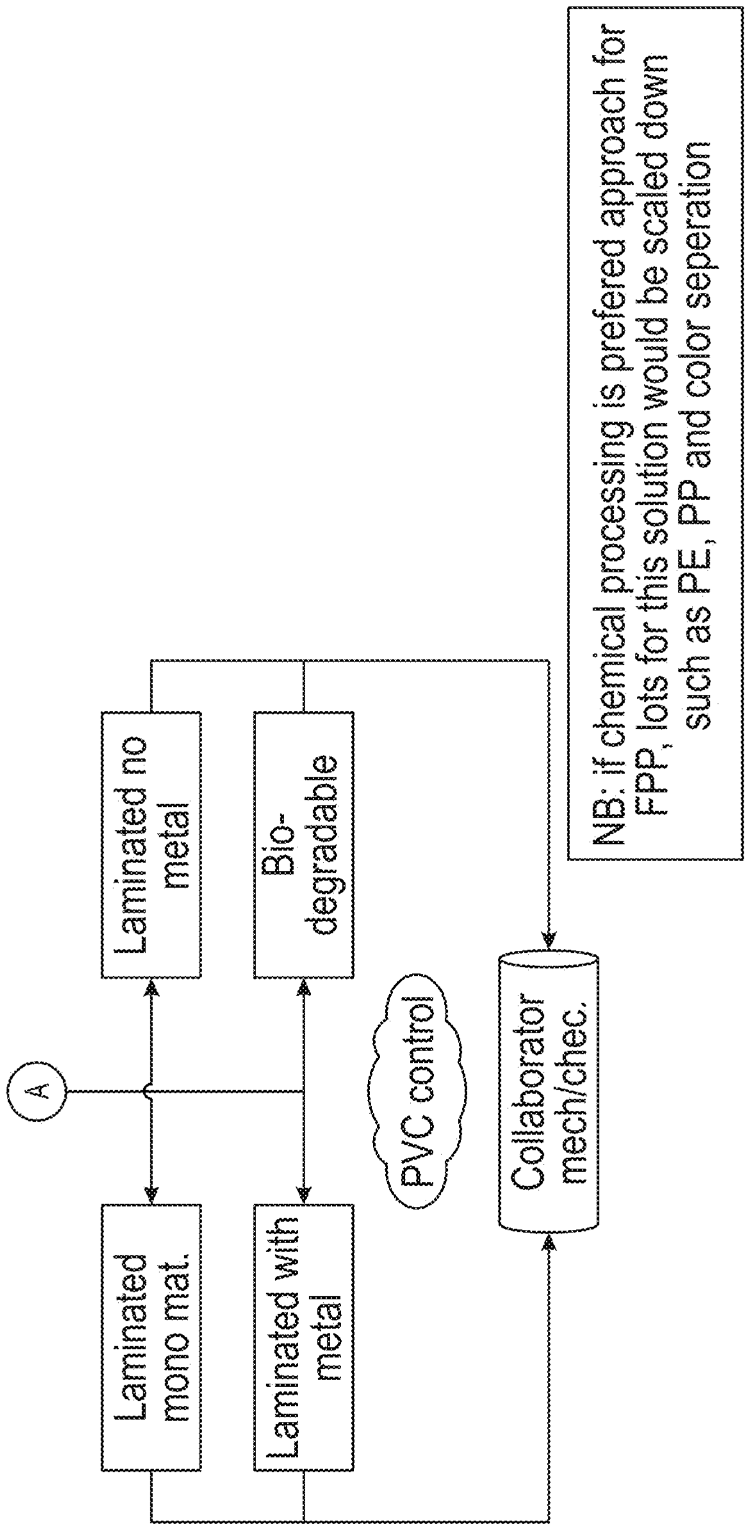

An illustrative embodiment of a process flow diagram for Line 5 of system 100 is shown in FIG. 8. Line 5 is dedicated to Flexible Plastics Packaging (FPP) sorting. Line 5 is also designed to enable the producer responsibility organizations (PROs) to meet multiple end markets as technologies and processes evolve.

In certain illustrative embodiments, Line 5 for FFP (like the other lines in system 100) can mostly be fed by baled material coming from the other PCF/MRF with any additional loose FPP coming from the other lines. To enable this, Line 5 can begin with a long staging conveyor to maximize operator time and tasks. Incoming bales can be delivered to a de-wiring unit as well as bale breaker before being conveyed to a metering bin that can also be fed by loose material.

In certain illustrative embodiments, the next step of Line 5 involves segregating the material by size fraction not only to distribute the volume on parallel lines but to have designated technology on a specific fraction and increase performance of these technologies by working a smaller size fraction range. This step also helps free material that is inside the flexible packaging. Fines (50 mm minus) from the screening process can be directed to Line 4 for further processing while overs can go through a size reduction unit to be reintroduced into the metering bin. The size reducers can limit the material size going downstream as well as help liberate material that could be inside the flexible packaging.

In certain illustrative embodiments, the three remaining fractions (small, medium and large) can pass under a magnet for iron (Fe) material removal. Each size fraction thereafter can have a different process due to expected characterization. For the small size fraction, the material can pass over an eddy current for NFe removal prior to passing to a 2D/3D ballistic separator. The 3D fraction can be directed to Line 3 for further processing and recovery, and the 2D fraction can be processed via a 2-step optical sort for PE film removal and a 2-step approach optical sort for PP film removal. The 2-step approaches are design to create flexibility around recovery and purity. The extracted PE and PP can then be combined with PP and PE colored from other size fractions and directed to a staging area. An optional recovery unit on the remaining material can be used to increase recovery on first pass for PE/PP. Knowing that fiber is typically part of contamination from PCF/MRF FPP bales, Line 5 can include an optical sorter to remove such fiber before any other processing to eliminate this contamination in addition to increasing recovery for this material and generate revenue.

In certain illustrative embodiments, after removal of Fe, NFe, PE and PP film and fiber, most of the remaining material in Line 5 can be rich in laminated packaging. The laminated packaging can be segregated into multiple fractions, such as bio-degradable plastics, laminated with and without metal layer as well as mono-material vs. multi-material, as desired to increase recovery. The negative fraction from the other two size fractions can be combined with this material and be subject to the same options. Also, PVC extraction can also be integrated into the process.

In certain illustrative embodiments, for medium and large size fraction, a similar approach can be used, but no eddy current is utilized as this material type typically does not appear in this fraction size. Also, a medium fraction can be implemented with color separation on both PE and PP to increase circularity and higher commodity value in end markets. The color separation can be a 2-step approach to create flexibility around recovery and purity. For the large size fraction, only PE film is targeted with optional color separation. Having Line 5 on the same physical footprint 150 with the other lines in system 100 provides a location for the residue stream thereby increasing the recovery.

Figure 9:
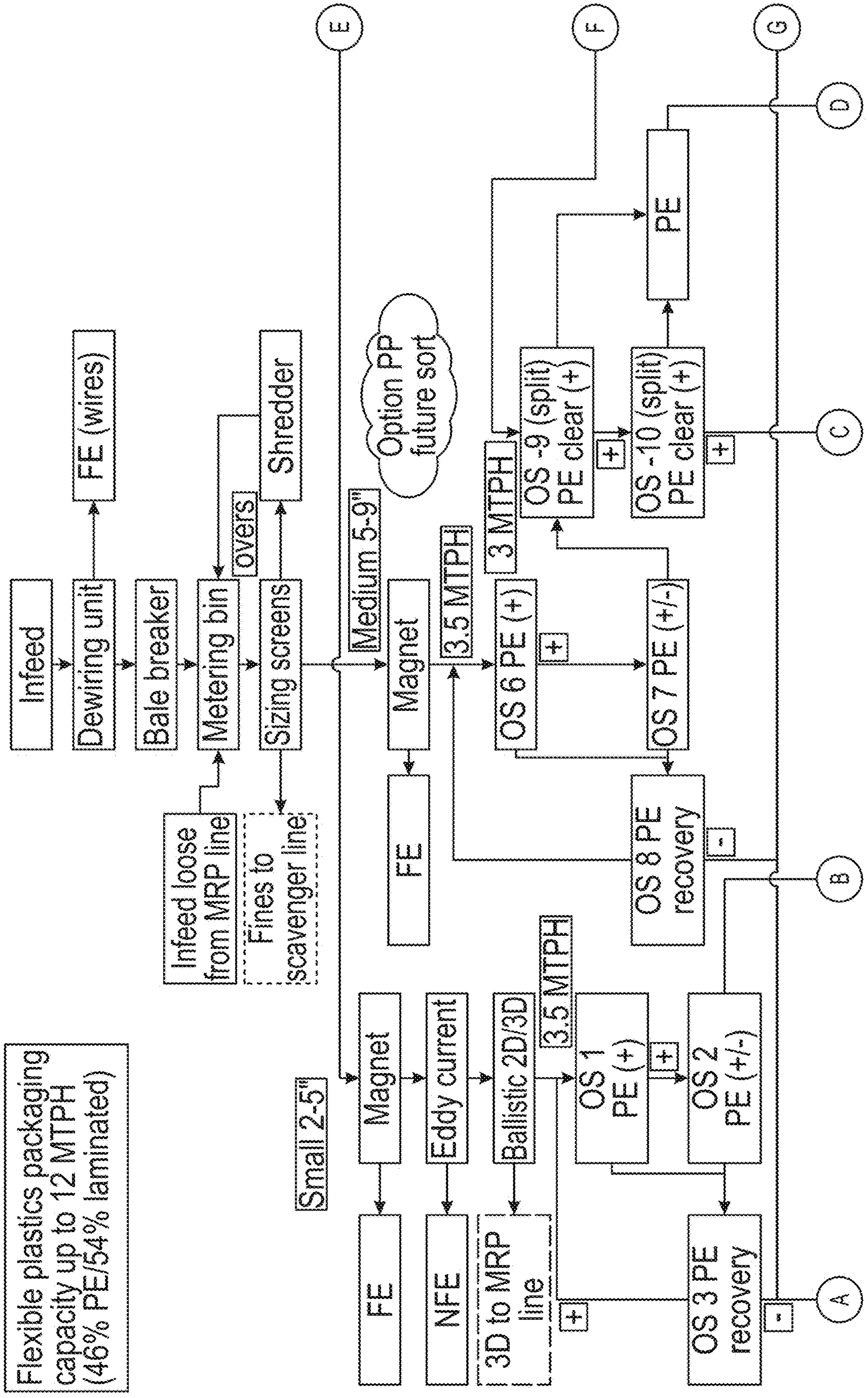
FIG. 9 is a process flow diagram of an alternate design for a flexible plastics packaging line in an improved combination of plastics processing facility and plastics recovery facility, in accordance with an illustrative embodiment of the presently disclosed subject matter.
Figure 9:
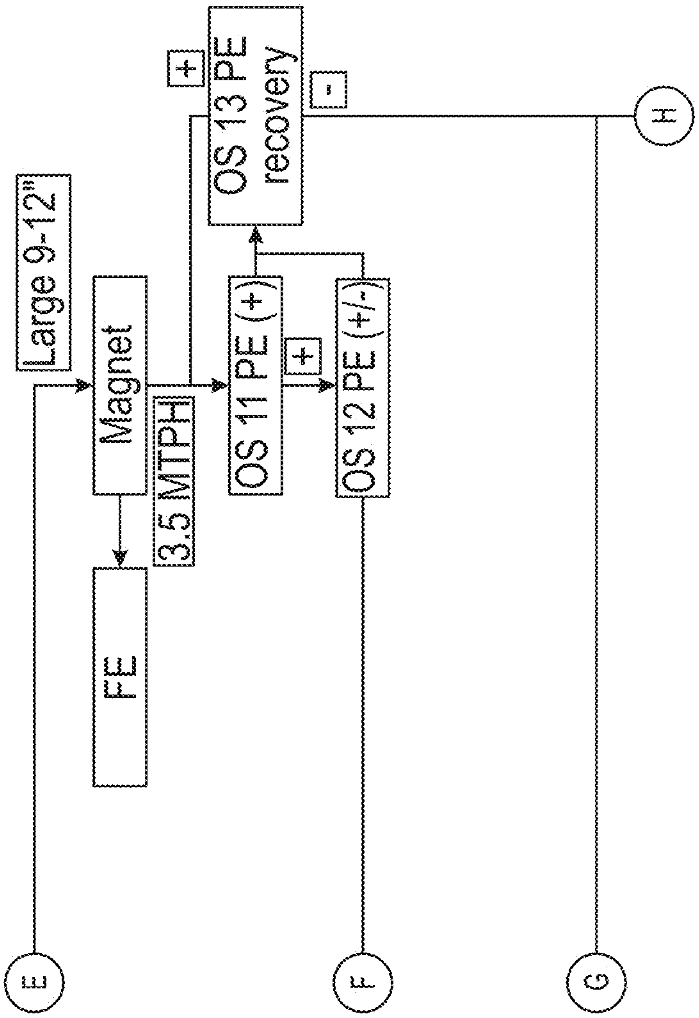
Figure 9:
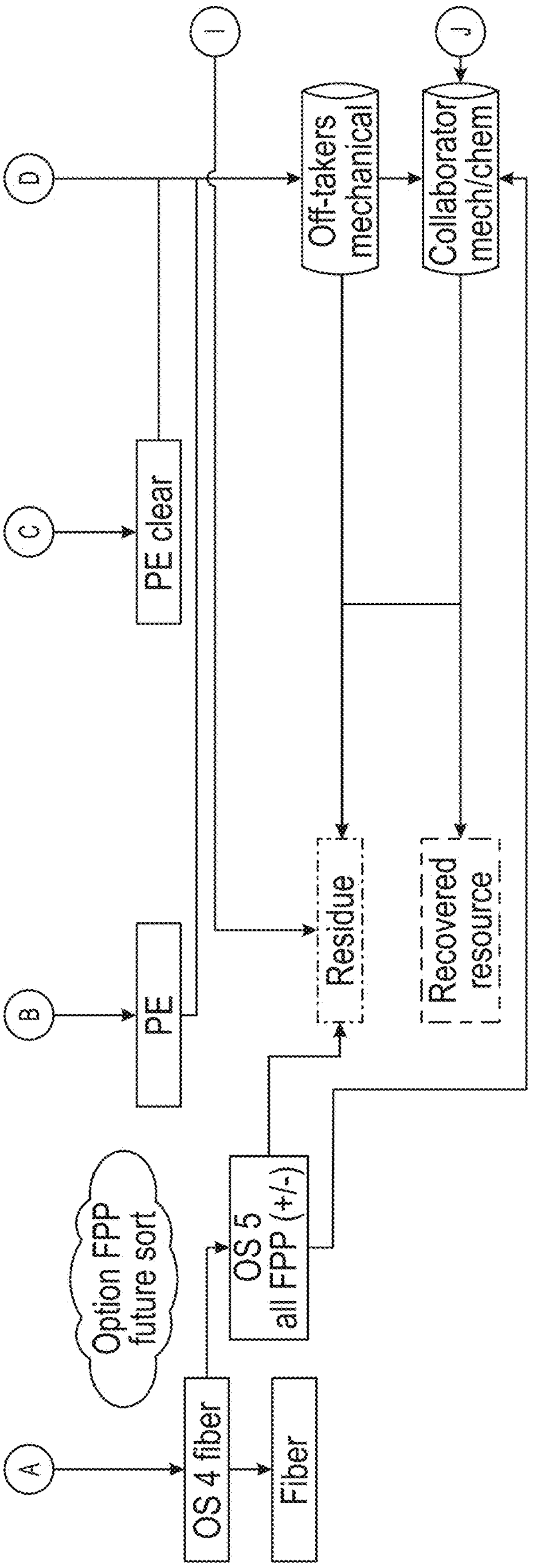
Figure 9:
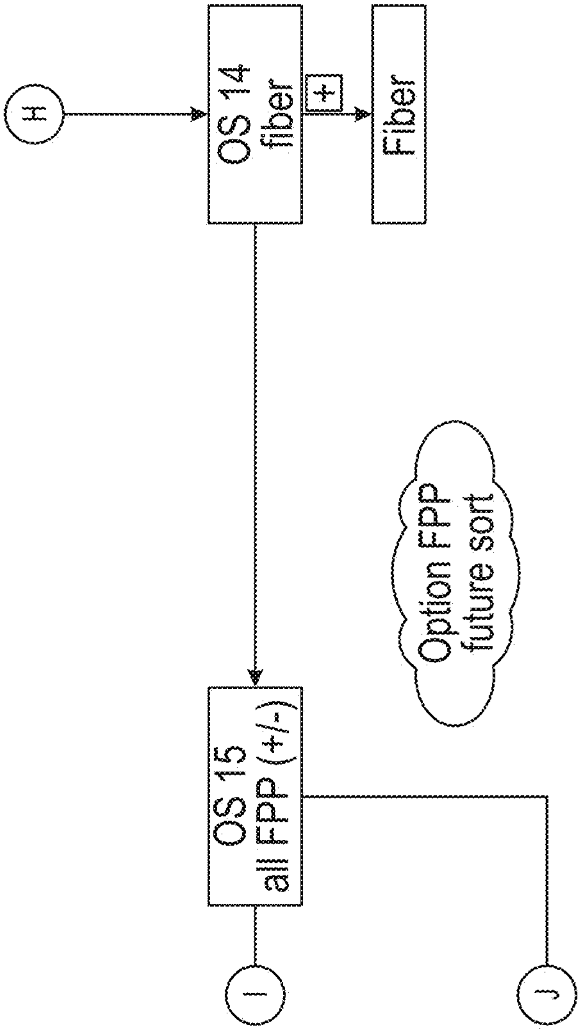

A process flow diagram for an alternative design for a Flexible Plastics Packaging (FPP) line in an improved combination of plastics processing facility and plastics recovery facility is shown in FIG. 9. In the alternative design, the FPP line has been altered/expanded to achieve similar sorting while reducing cost.

The system and process described herein may include a plurality of sequential, non-sequential, or sequence independent steps or stages using, for example, the systems and equipment shown or described herein. Note that the process shown in FIGS. 1-9 is exemplary and may be performed in different orders and/or sequences as dictated or permitted by the system and equipment described herein, and any alternative embodiments thereof, unless a particular ordering is otherwise specifically indicated in an embodiment set forth herein.

In addition, the processes described herein are not limited to the specific use of the system and equipment described herein but may be performed using any system and equipment that is capable of operating as described in connection with the processes shown in the figures. Numerous arrangements of the various stages, techniques, equipment and materials can be utilized. In addition, not all stages, techniques, equipment and materials described herein need be utilized in all embodiments.

For example, and without limitation, certain figures herein (for example, FIG. 2, FIG. 3, FIG. 4, FIG. 5, FIG. 6, FIG. 7, FIG. 8 and FIG. 9) have "clouds" that encircle areas of the process flow, at least some with the word "option" therein. These "clouds" are intended to show where option process steps are shown, that are may or may not be included as part of system 100 as desired.

In certain illustrative embodiments, system 100 can maximize recovery of plastics resins, whether rigid or flexible, and also prepare material for secondary processing based on end market needs and targets. Besides plastics grades, the front-end processes described herein can generating materials such as Fe and NFe as well as fiber that can be sold to dedicated markets.

A listing of potential end markets for recovered resources from system 100 is provided in FIG. 10.

In certain illustrative embodiments, a system 100 for plastics processing and recovery is provided. The system 100 can include a first process stream configured to receive a first feed material and to recover polyethylene terephthalate (PET) from the first feed material; a second process stream configured to receive a second feed material and recover at least one selected from the group of polyethylene (PE), polypropylene (PP) and polystyrene (PS) and combinations thereof from the second feed material; a third process stream configured to receive a third feed material and recover plastics residuals from the third feed material; a fourth process stream configured to receive a fourth feed material and recover fines and glass residue from the fourth feed material; and a fifth process stream configured to receive a fifth feed material and recover flexible plastic packaging from the fifth feed material. The first process stream, the second process stream, the third process stream, the fourth process stream and the fifth process stream can all be located at the same facility site. In certain aspects, the first process stream, the second process stream, the third process stream, the fourth process stream and the fifth process stream are all located in co-operational proximity to each other at the same facility site. The third feed material can include at least one selected from the group of a recovery stream from the first process stream, a recovery stream from the second process stream, and a recovery stream from the fifth process stream and combinations thereof. The product yield of polyethylene terephthalate (PET) from the first feed material can be at least 80%, by weight percent. The product yield of polyethylene terephthalate (PET) from the first feed material can be in the range from 80%-98%, by weight percent.

In certain illustrative embodiments, a method 200 of plastics processing and recovery is provided. A first feed material in a first process stream can be processed to recover polyethylene terephthalate (PET) from the first feed material. A second feed material in a second process stream can be processed to recover at least one material selected from the group of polyethylene (PE), polypropylene (PP) and polystyrene (PS) and combinations thereof from the second feed material. A third feed material in a third process stream can be processed to recover plastics residuals from the third feed material. A fourth feed material in a fourth process stream can be processed to recover fines and glass residue from the fourth feed material. A fifth feed material in a fifth process stream can be processed to recover flexible plastic packaging from the fifth feed material. In certain aspects, the first process stream, the second process stream, the third process stream, the fourth process stream and the fifth process stream are all located at the same facility site. The first process stream, the second process stream, the third process stream, the fourth process stream and the fifth process stream can all be located in co-operational proximity to each other at the same facility site. The third feed material can include at least one selected from the group of a recovery stream from the first process stream, a recovery stream from the second process stream, and a recovery stream from the fifth process stream and combinations thereof. The product yield of polyethylene terephthalate (PET) from the first feed material can be at least 80%, by weight percent. The product yield of polyethylene terephthalate (PET) from the first feed material can be in the range from 80%-98%, by weight percent.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C. As used herein, the term "A and/or B" means embodiments having element A alone, element B alone, or elements A and B taken together.

It is to be understood that any recitation of numerical ranges by endpoints includes all numbers subsumed within the recited ranges as well as the endpoints of the range.

The system and method described herein may include a plurality of sequential, non-sequential, or sequence independent steps or stages as described herein. Note that the processes shown in the figures and/or otherwise described herein are exemplary and may be performed in different orders and/or sequences as dictated or permitted by the system and equipment described herein, and any alternative embodiments thereof, unless a particular ordering is otherwise specifically indicated in an embodiment set forth herein.

In addition, the processes described herein are not limited to the specific use of the system and equipment described herein but may be performed using any system and equipment capable of operating as described in connection with the processes shown in the figures. Numerous arrangements of the various stages, techniques, equipment and materials can be utilized. In addition, not all stages, techniques, equipment and materials described herein need be utilized in all embodiments.

It should be noted that certain particular arrangements of equipment and/or process steps for the system and process described herein are materially distinguishable from, and provide distinct advantages over, previously known technologies, as described in further detail herein.

While the disclosed subject matter has been described in detail in connection with a number of embodiments, it is not limited to such disclosed embodiments. Rather, the disclosed subject matter can be modified to incorporate any number of variations, alterations, substitutions or equivalent arrangements not heretofore described, but which are commensurate with the scope of the disclosed subject matter.

Additionally, while various embodiments of the disclosed subject matter have been described, it is to be understood that aspects of the disclosed subject matter may include only some of the described embodiments. Accordingly, the disclosed subject matter is not to be seen as limited by the foregoing description, but is only limited by the scope of the claims.

It is to be understood that the described subject matter is not limited to the exact details of construction, operation, exact materials, or illustrative embodiments shown and described, as modifications and equivalents can be apparent to one skilled in the art. Accordingly, the subject matter is therefore to be limited only by the scope of the appended claims.

What is claimed is:

1. A system for plastics processing and recovery comprising:

a first process stream comprising a first sorting unit and configured to receive a first feed material and to recover polyethylene terephthalate (PET) from the first feed material;

a second process stream comprising a second sorting unit and configured to receive a second feed material and recover at least one selected from a group of polyethylene (PE), polypropylene (PP) and polystyrene (PS) and combinations thereof from the second feed material;

a third process stream comprising a third sorting unit and configured to receive a third feed material and recover plastics residuals from the third feed material;

a fourth process stream comprising a fourth sorting unit and configured to receive a fourth feed material and recover fines and glass residue from the fourth feed material; and a fifth process stream comprising a fifth sorting unit and configured to receive a fifth feed material and recover flexible plastic packaging from the fifth feed material, wherein the first process stream, the second process stream, the third process stream, the fourth process stream and the fifth process stream are co-located at a common facility.

2. The system of claim 1, wherein the first process stream, the second process stream, the third process stream, the fourth process stream and the fifth process stream are all located in co-operational proximity to each other at the common facility.

3. The system of claim 1, wherein the third feed material comprises at least one selected from the group of a recovery stream from the first process stream, a recovery stream from the second process stream, and a recovery stream from the fifth process stream and combinations thereof.

4. A method of plastics processing and recovery comprising:

processing a first feed material in a first process stream and recovering polyethylene terephthalate (PET) from the first feed material;

processing a second feed material in a second process stream and recovering at least one material selected from a group of polyethylene (PE), polypropylene (PP) and polystyrene (PS) and combinations thereof from the second feed material;

redirecting at least one of a first recovery stream from the first feed material different from the recovered PET or a second recovery stream from the second feed material different from the recovered PE, PP, and PS to form a portion of a third feed material;

processing the third feed material in a third process stream and recovering plastics residuals from the third feed material;

processing a fourth feed material in a fourth process stream and recovering fines and glass residue from the fourth feed material; and processing a fifth feed material in a fifth process stream and recovering flexible plastic packaging from the fifth feed material, wherein the first process stream, the second process stream, the third process stream, the fourth process stream and the fifth process stream are co-located at a common facility.

5. The method of claim 4, wherein the first process stream, the second process stream, the third process stream, the fourth process stream and the fifth process stream are all located in co-operational proximity to each other at the common facility.

6. The method of claim 4, wherein the third feed material comprises the first recovery stream from the first process stream, the second recovery stream from the second process stream, and a third recovery stream from the fifth process stream.

7. A system for plastics processing and recovery comprising:

a first process stream configured to receive a first feed material and to recover polyethylene terephthalate (PET) from the first feed material;

a second process stream configured to receive a second feed material and recover at least one selected from a group of polyethylene (PE), polypropylene (PP) and polystyrene (PS) from the second feed material;

a third process stream configured to:

receive a third feed material;

recover plastics residuals from the third feed material;

redirect a first recovery stream to form a portion of a fourth feed material;

redirect a second recovery stream to form a portion of a fifth feed material; and separate, from the recovered plastics residuals, a black plastic material;

a fourth process stream configured to receive a fourth feed material and recover fines and glass residue from the fourth feed material; and a fifth process stream configured to receive a fifth feed material and recover flexible plastic packaging from the fifth feed material, wherein the first process stream, the second process stream, the third process stream, the fourth process stream and the fifth process stream are co-located at a common facility.

8. The system of claim 7, wherein the third process stream is further configured to separate the black plastic material is accordance with a resin type.

9. A system for plastics processing and recovery comprising:

a first process stream configured to receive a first feed material and to recover polyethylene terephthalate (PET) from the first feed material;

a second process stream configured to receive a second feed material and recover at least one selected from a group of polyethylene (PE), polypropylene (PP) and polystyrene (PS) and combinations thereof from the second feed material;

a third process stream configured to receive a third feed material and recover plastics residuals from the third feed material;

a fourth process stream configured to receive a fourth feed material and recover fines and glass residue from the fourth feed material; and a fifth process stream configured to receive a fifth feed material and recover flexible plastic packaging from the fifth feed material, the fifth process stream comprising:

a first optical sort stream configured to remove PP film; and a second optical sort stream configured to remove PE film, wherein the first process stream, the second process stream, the third process stream, the fourth process stream and the fifth process stream are co-located at a common facility.

10. The system of claim 9, wherein:

the fifth process stream comprises:

a magnet station configured to remove Fe;

an eddy current station configured to remove NFe;

a ballistic separator configured to remove PE and PP film; and a laminated packaging station downstream of the magnet station, the eddy current station, and the ballistic separator, the laminated packaging station configured to segregate laminated packaging into multiple fractions.

11. The system of claim 10, wherein the multiple fractions include at least two of:

bio-degradable plastics;

laminated mono-material; and laminated multi-material.

* * * * *